United States Patent
Curry et al.

(10) Patent No.: US 8,319,358 B2
(45) Date of Patent: Nov. 27, 2012

(54) ELECTRIC VEHICLE CHARGING METHODS, BATTERY CHARGING METHODS, ELECTRIC VEHICLE CHARGING SYSTEMS, ENERGY DEVICE CONTROL APPARATUSES, AND ELECTRIC VEHICLES

(75) Inventors: Dave Earl Curry, Spokane, WA (US); Brett Patrick Turner, Liberty Lake, WA (US); Scott Robert Hamilton, Spokane, WA (US); Douglas Lynn Staker, Spokane, WA (US)

(73) Assignee: Demand Energy Networks, Inc., Liberty Lake, WA (US)

( * ) Notice: Subject to any disclaimer, the term of this patent is extended or adjusted under 35 U.S.C. 154(b) by 476 days.

(21) Appl. No.: 12/533,834

(22) Filed: Jul. 31, 2009

(65) Prior Publication Data
US 2010/0006356 A1    Jan. 14, 2010

Related U.S. Application Data

(63) Continuation-in-part of application No. 12/165,405, filed on Jun. 30, 2008, now Pat. No. 8,097,967.

(51) Int. Cl.
*F02D 29/06* (2006.01)
*H02P 9/04* (2006.01)

(52) U.S. Cl. .............................. 290/1 A; 290/50; 322/37

(58) Field of Classification Search .................. 290/1 R, 290/1 A, 7, 50; 322/1, 37
See application file for complete search history.

(56) References Cited

U.S. PATENT DOCUMENTS

| | | | |
|---|---|---|---|
| 1,279,392 A | 9/1918 | Martinetto |
| 2,194,822 A | 3/1940 | Dannheiser |
| 3,050,635 A | 8/1962 | Tanner |
| 3,571,693 A | 3/1971 | Riaz |
| 4,131,827 A | 12/1978 | Larrabee |
| 4,203,041 A | 5/1980 | Sachs |
| 4,465,943 A | 8/1984 | Risberg |
| 4,473,792 A | 9/1984 | Nola |
| 5,028,804 A | 7/1991 | Lauw |
| 5,327,066 A | 7/1994 | Smith |
| 5,422,624 A | 6/1995 | Smith |
| 5,476,293 A | 12/1995 | Yang |
| 5,499,181 A | 3/1996 | Smith |
| 5,576,613 A | 11/1996 | Yang |

(Continued)

FOREIGN PATENT DOCUMENTS
JP    2001-045796    2/2001
(Continued)

OTHER PUBLICATIONS

U.S. Appl. No. 60/915,347, filed May 1, 2007; "Plug-In-Vehicle Management System"; Seth W. Bridges et al.; 17 pp.
(Continued)

*Primary Examiner* — Nicholas Ponomarenko
(74) *Attorney, Agent, or Firm* — Wells St. John, P.S.

(57) ABSTRACT

Electric vehicle charging methods, battery charging methods, electric vehicle charging systems, energy device control apparatuses, and electric vehicles are described. In one arrangement, an electric vehicle charging method includes receiving information regarding charging of an electric vehicle with energy from an electric power grid, determining an amount of energy stored by an energy storage device coupled to the electric power grid, and controlling a transfer of the energy stored by the energy storage device to the electric power grid using the information regarding the charging of the electric vehicle. Other arrangements are described.

29 Claims, 9 Drawing Sheets

U.S. PATENT DOCUMENTS

| | | | |
|---|---|---|---|
| 5,642,270 | A | 6/1997 | Green et al. |
| 5,689,174 | A | 11/1997 | Pacheco, Sr. |
| 5,717,374 | A | 2/1998 | Smith |
| 5,742,229 | A | 4/1998 | Smith |
| 5,767,584 | A * | 6/1998 | Gore et al. ............... 290/1 R |
| 5,803,215 | A | 9/1998 | Henze et al. |
| 5,804,948 | A | 9/1998 | Foust |
| 5,806,018 | A | 9/1998 | Smith et al. |
| 5,880,537 | A | 3/1999 | Windhorn |
| 5,914,654 | A | 6/1999 | Smith |
| 5,931,021 | A | 8/1999 | Shnaid et al. |
| 6,018,293 | A | 1/2000 | Smith |
| 6,067,008 | A | 5/2000 | Smith |
| 6,107,691 | A * | 8/2000 | Gore et al. ............... 290/1 R |
| 6,185,501 | B1 | 2/2001 | Smith et al. |
| 6,522,031 | B2 | 2/2003 | Provanzana et al. |
| 6,697,951 | B1 | 2/2004 | Sinha et al. |
| 6,727,809 | B1 | 4/2004 | Smith |
| 6,788,031 | B2 | 9/2004 | Pendell |
| 6,812,586 | B2 | 11/2004 | Wacknov et al. |
| 6,998,728 | B2 | 2/2006 | Gupta et al. |
| 7,064,513 | B2 | 6/2006 | Fenley |
| 7,161,253 | B2 | 1/2007 | Sodemann et al. |
| 7,200,994 | B2 | 4/2007 | Chertok |
| 7,212,916 | B2 | 5/2007 | Alewine et |
| 7,248,490 | B2 | 7/2007 | Olsen et al. |
| 7,262,694 | B2 | 8/2007 | Olsen et al. |
| 7,274,975 | B2 | 9/2007 | Miller |
| 7,385,373 | B2 | 6/2008 | Doruk et al. |
| 7,388,299 | B2 | 6/2008 | Blackman |
| 7,566,991 | B2 | 7/2009 | Blackman |
| 7,579,702 | B2 | 8/2009 | Park et al. |
| 7,609,019 | B2 | 10/2009 | Beck et al. |
| 7,737,571 | B2 * | 6/2010 | Fein et al. .................. 290/44 |
| 7,888,916 | B1 | 2/2011 | Taylor |
| 7,999,405 | B2 * | 8/2011 | Peterson .................... 290/40 C |
| 8,097,967 | B2 * | 1/2012 | Hamilton ................... 290/1 A |
| 2002/0175522 | A1 | 11/2002 | Wacknov et al. |
| 2004/0201218 | A1 | 10/2004 | Hebert |
| 2004/0262996 | A1 | 12/2004 | Olsen |
| 2004/0263116 | A1 | 12/2004 | Olsen et al. |
| 2006/0032045 | A1 | 2/2006 | Naarmann et al. |
| 2006/0129283 | A1 | 6/2006 | Alewine et al. |
| 2006/0237970 | A1 | 10/2006 | Bailey |
| 2007/0005192 | A1 | 1/2007 | Schoettle et al. |
| 2007/0005195 | A1 | 1/2007 | Pasquale et al. |
| 2007/0063677 | A1 | 3/2007 | Schauder |
| 2007/0182383 | A1 | 8/2007 | Park et al. |
| 2007/0203860 | A1 | 8/2007 | Golden et al. |
| 2007/0230427 | A1 | 10/2007 | Arseneault et al. |
| 2007/0271006 | A1 | 11/2007 | Golden et al. |
| 2007/0276547 | A1 | 11/2007 | Miller |
| 2007/0290636 | A1 | 12/2007 | Beck et al. |
| 2008/0040223 | A1 | 2/2008 | Bridges et al. |
| 2008/0040295 | A1 | 2/2008 | Kaplan et al. |
| 2008/0048854 | A1 | 2/2008 | Olsen et al. |
| 2008/0114499 | A1 | 5/2008 | Hakim et al. |
| 2008/0143302 | A1 | 6/2008 | Pierce |
| 2008/0167756 | A1 | 7/2008 | Golden et al. |
| 2008/0198747 | A1 | 8/2008 | Young et al. |
| 2008/0281663 | A1 | 11/2008 | Hakim et al. |
| 2010/0006356 | A1 | 1/2010 | Curry et al. |

FOREIGN PATENT DOCUMENTS

| | | |
|---|---|---|
| JP | 2004-140991 | 5/2004 |
| KR | 10-0668118 | 1/2007 |
| NZ | 590217 | 4/2012 |
| WO | PCT/US2009/049039 | 2/2010 |
| WO | PCT/US2010/043883 | 3/2011 |
| WO | PCT/US2010/043883 | 1/2012 |

OTHER PUBLICATIONS

U.S. Appl. No. 60/869,439, filed Dec. 11, 2006; "Distributed Energy-Storage Management System"; Seth W. Bridges et al.; 20 pp.

U.S. Appl. No. 60/822,047, filed Aug. 10, 2006; "Vehicle-To-Grid Power Flow Management System"; David L. Kaplan; 12 pp.

U.S. Appl. No. 60/980,663, filed Oct. 17, 2007; "Plug-In-Vehicle Mangement System"; Seth Bridges et al.; 18 pp.

"A Robust PHEV Logging Solution from V2Green"; www.v2green.com; 2008; 6 pp.

"Revolutionizing the Way You Think About Energy"; www.gridpopint.com; 2008; 28 pp.

* cited by examiner

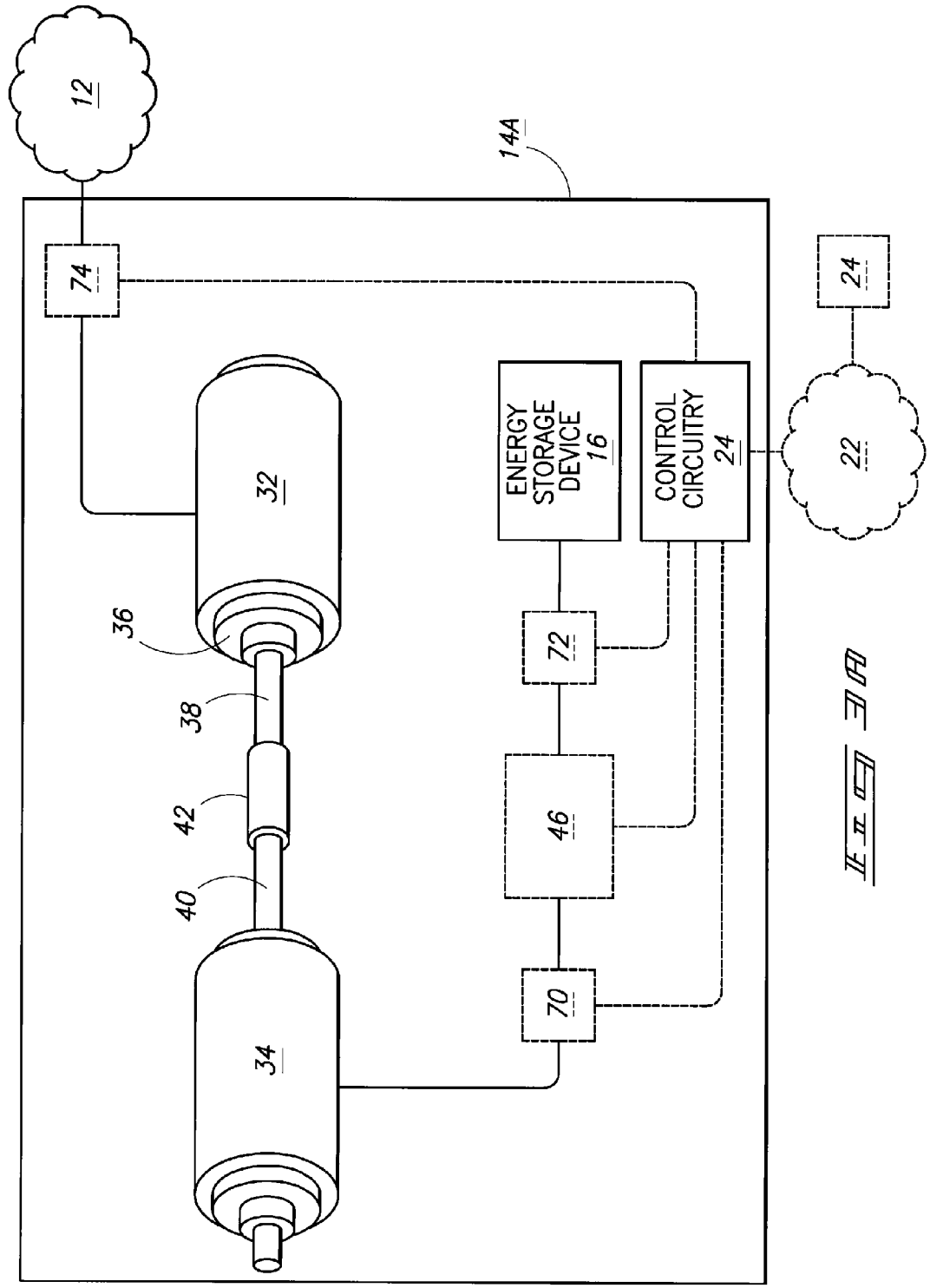

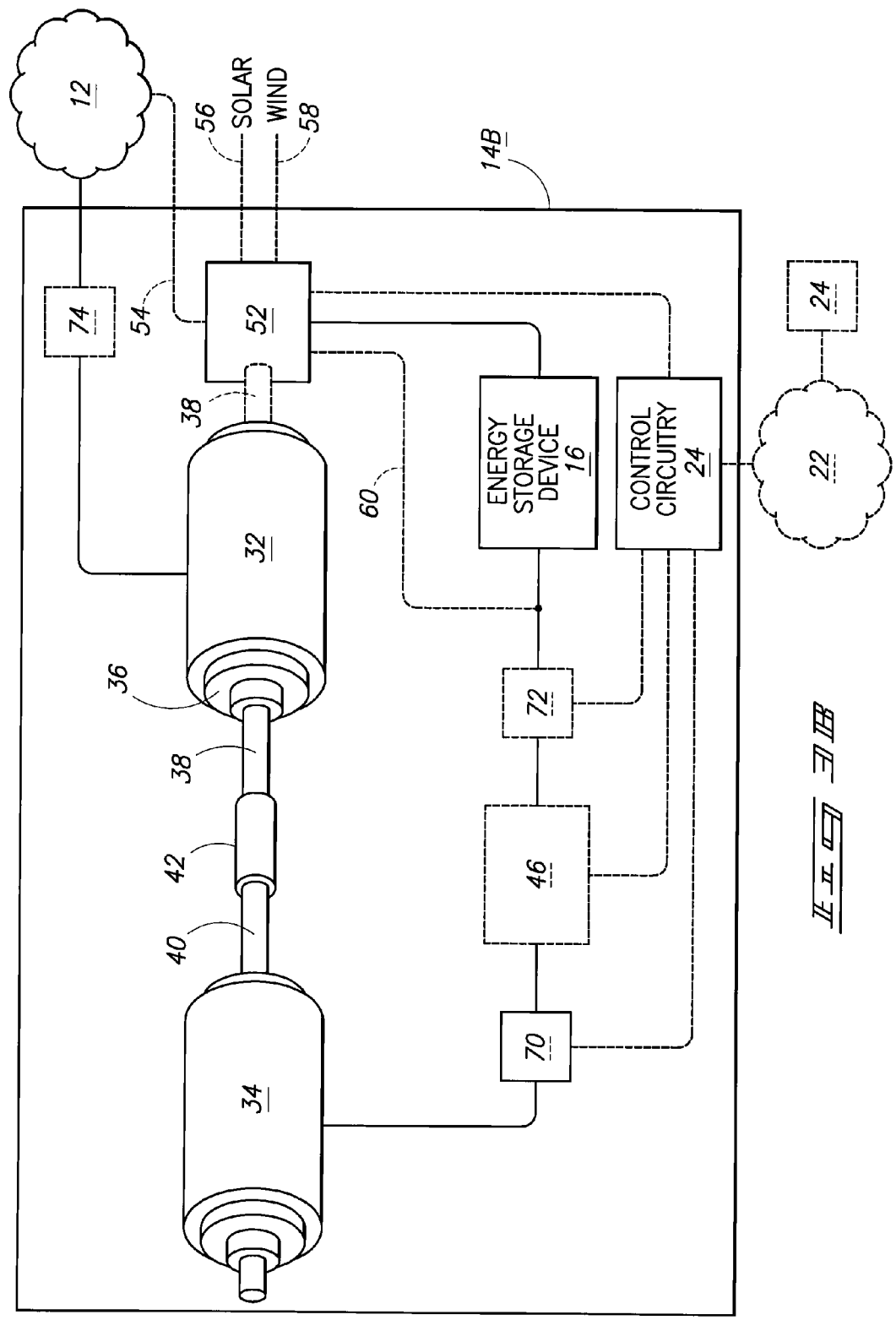

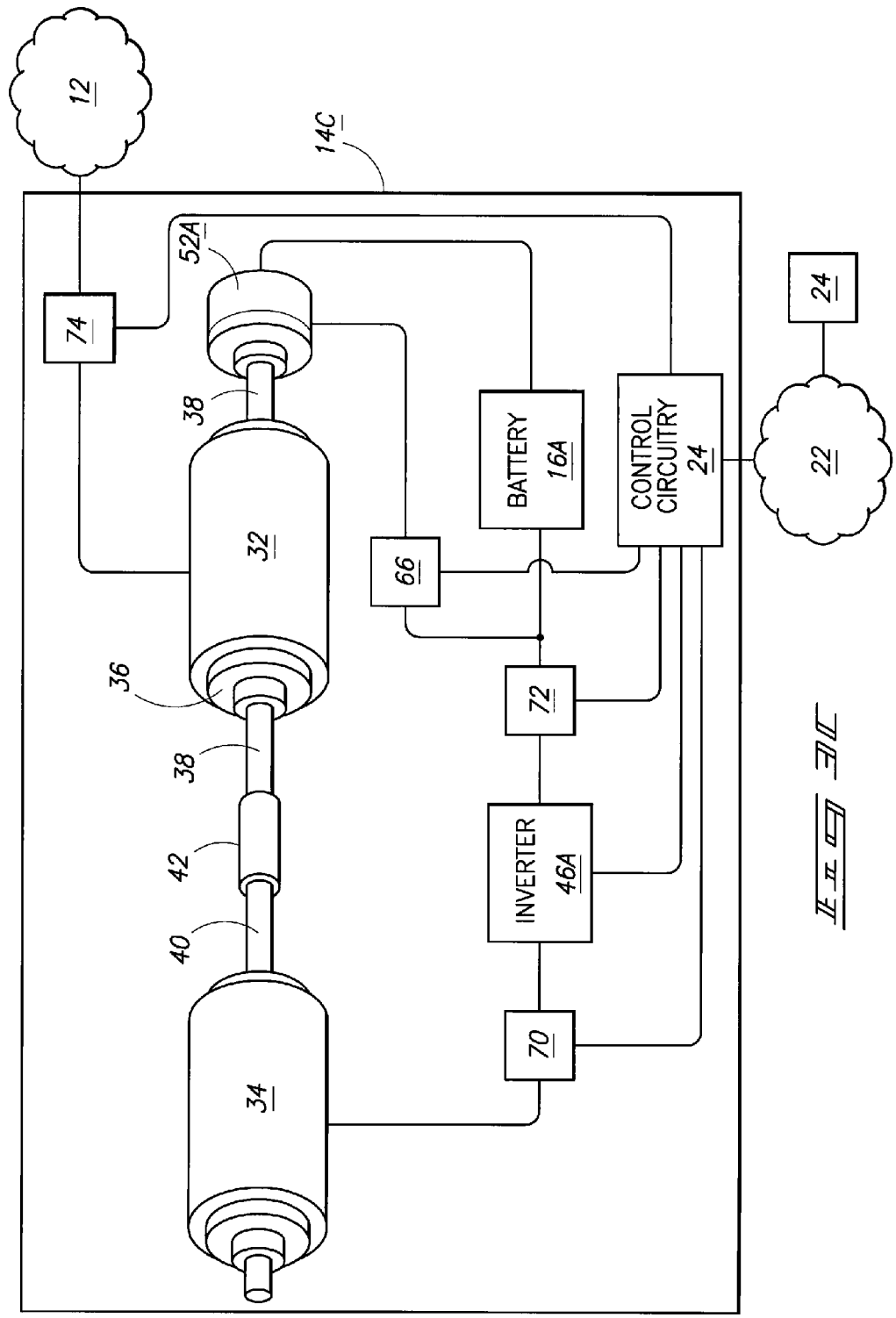

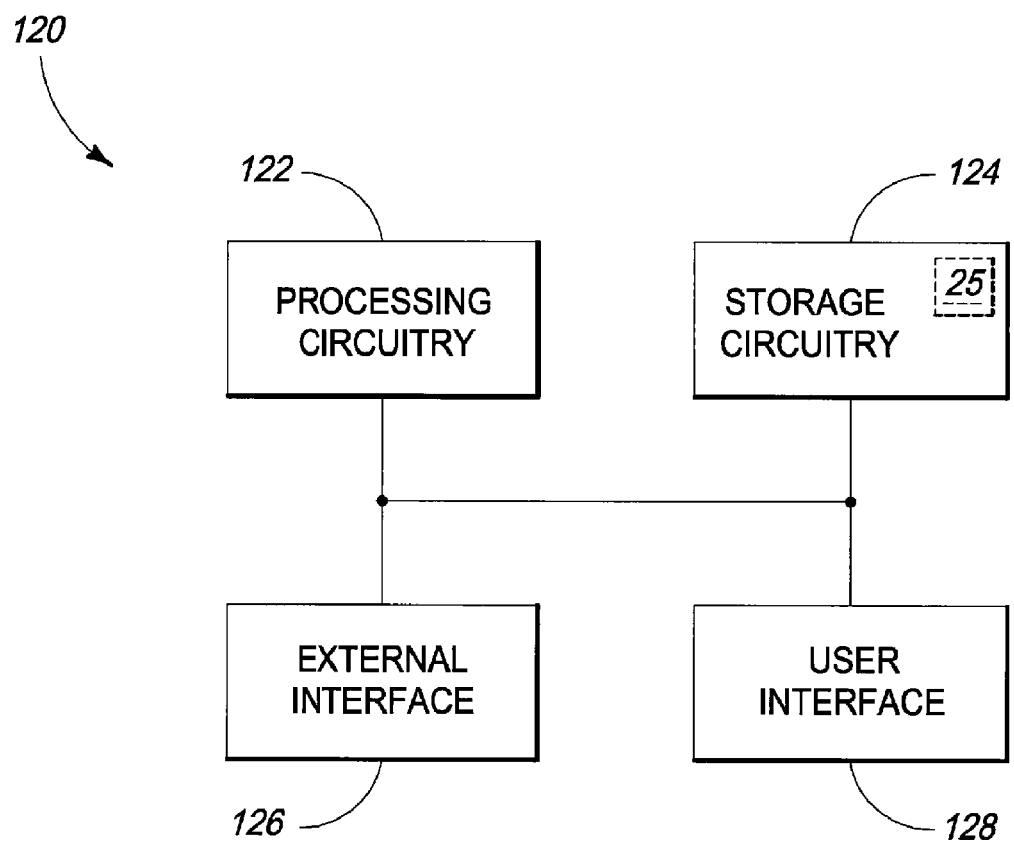
F I G 5

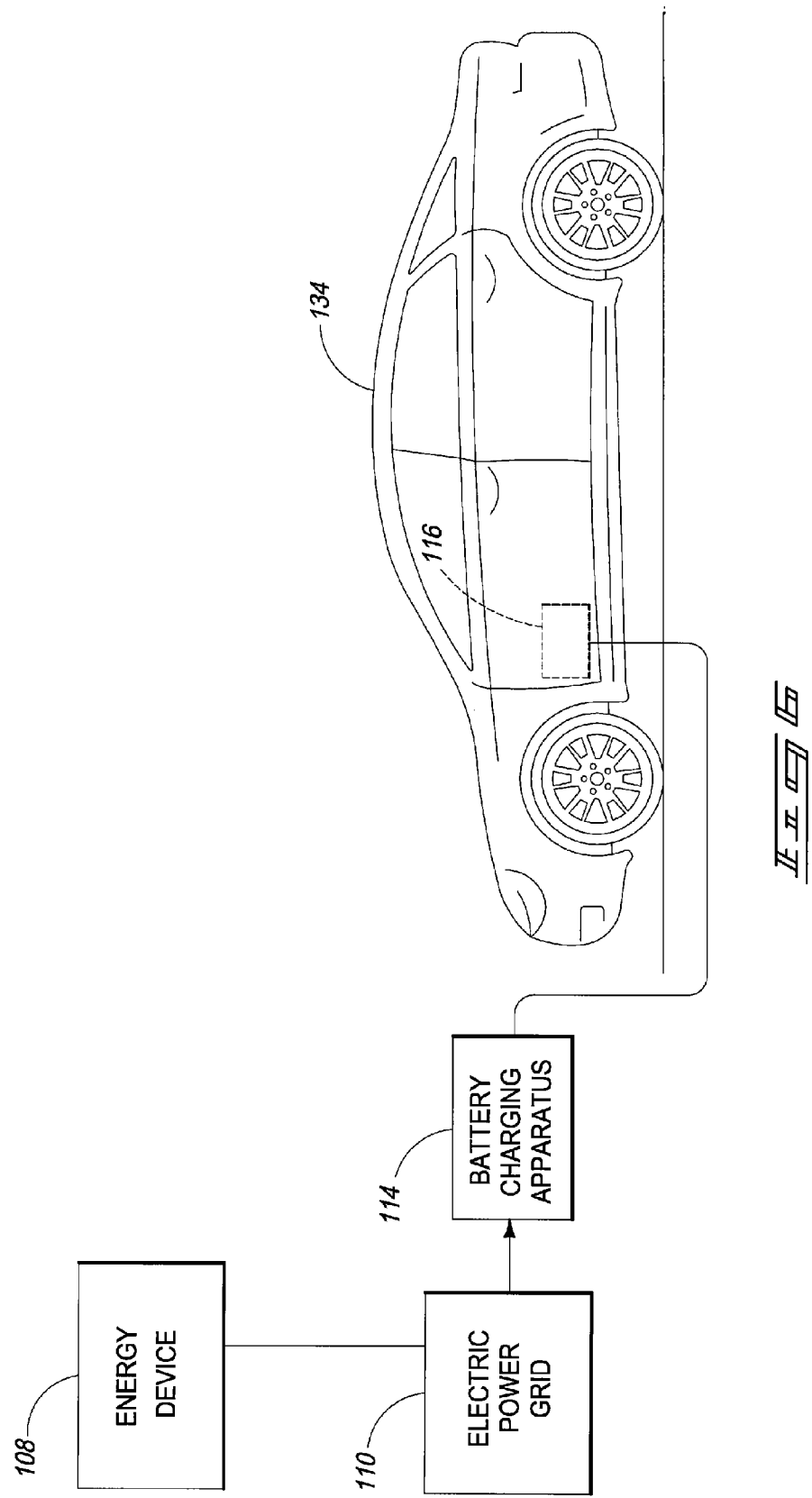

ELECTRIC VEHICLE CHARGING METHODS, BATTERY CHARGING METHODS, ELECTRIC VEHICLE CHARGING SYSTEMS, ENERGY DEVICE CONTROL APPARATUSES, AND ELECTRIC VEHICLES

This application is a continuation in part of a U.S. patent application titled "Energy Systems, Energy Devices, Energy Utilization Methods, and Energy Transfer Methods" filed 30 Jun. 2008 having Ser. No. 12/165,405, now U.S. Pat. No. 8,097,967 herein incorporated by reference.

TECHNICAL FIELD

The present invention, in various embodiments, relates to electric vehicle charging methods, battery charging methods, electric vehicle charging systems, energy device control apparatuses, and electric vehicles.

BACKGROUND OF THE INVENTION

Devices exist that generate alternating current (AC) power. Some of these devices are designed to generate AC power when an AC power grid (e.g., an AC power grid operated by an electric utility company) is non-operational. For example, diesel generators are commonly used to provide emergency AC power to buildings that house computers and/or telecommunications equipment. Small devices having a battery and an inverter are also commonly used to provide AC power to a computer in the event of a power grid failure. Such devices are configured to provide AC power while the power grid is non-operational.

Other devices are configured to transfer AC power derived from wind or solar energy to the power grid while the power grid is operational. These devices commonly use inverters to generate AC voltage independent of the power grid and then feed the independently generated power synchronously into the power grid.

As electric vehicles become more common, electric power grids may need to increase their capacity in order to accommodate charging of large numbers of electric vehicles. Increasing capacity by building new power generating facilities is costly and time consuming. Accordingly, methods of increasing an electric power grid's capacity without having to build new power generating facilities may be advantageous.

BRIEF DESCRIPTION OF THE DRAWINGS

Embodiments of the invention are described below with reference to the following accompanying drawings.

FIG. 3A is a block diagram of an energy device according to one embodiment.

FIG. 3B is a block diagram of an energy device according to one embodiment.

FIG. 3C is a block diagram of an energy device according to one embodiment.

FIG. 5 is a block diagram of a controller according to one embodiment.

FIG. 6 is an illustrative representation of an electrical vehicle coupled with a battery charging apparatus and an electric power grid system according to one embodiment.

DETAILED DESCRIPTION

According to some aspects of the disclosure, a charging system may be used to charge a rechargeable battery using energy from an electric power grid. The system may also control a transfer of energy stored by an energy device into the electric power grid. In some embodiments, the stored energy that is transferred to the electric power grid may offset the energy taken from the electric power grid to charge the rechargeable battery. An account may be debited based on the amount of energy used to charge the rechargeable battery and may be credited based on the amount of energy transferred to the electric power grid from the energy device. In some embodiments, the rechargeable battery may be part of an electric vehicle.

The energy device that stores and transfers energy may be embodied in a number of different ways. According to some aspects of the disclosure, the energy device may provide power to a power grid while the power grid is operational. In one embodiment, the energy device may include an induction generator having a shaft and a stator. The induction generator may be connected to the power grid so that the power grid supplies an excitation voltage and inductive current for the induction generator. In one embodiment, the energy device may also include a motor. The motor may use energy stored by an energy storage device to rotate a rotor coupled to the shaft of the induction generator at a rotational speed greater than a synchronous speed of the induction generator in one embodiment. Consequently, the induction generator may generate AC power that is transferred to the power grid via induced magnetic coupling between the rotor and the stator.

In some embodiments, the energy device may replenish the energy stored in the energy storage device. In some embodiments, the energy device may store energy in the energy storage device and later use the stored energy to generate AC power and transfer the generated AC power to the power grid.

In some embodiments, the energy device may draw power from the power grid during times when the power is available at a first price and convert the power into energy stored by the energy storage device. Later, the energy device may convert the stored energy into AC power and provide the AC power to the power grid during times when the power may be sold to an entity operating the power grid at a second price that is higher than the first price. Additional aspects of the disclosure are described in the illustrative embodiments below.

Figure 1:
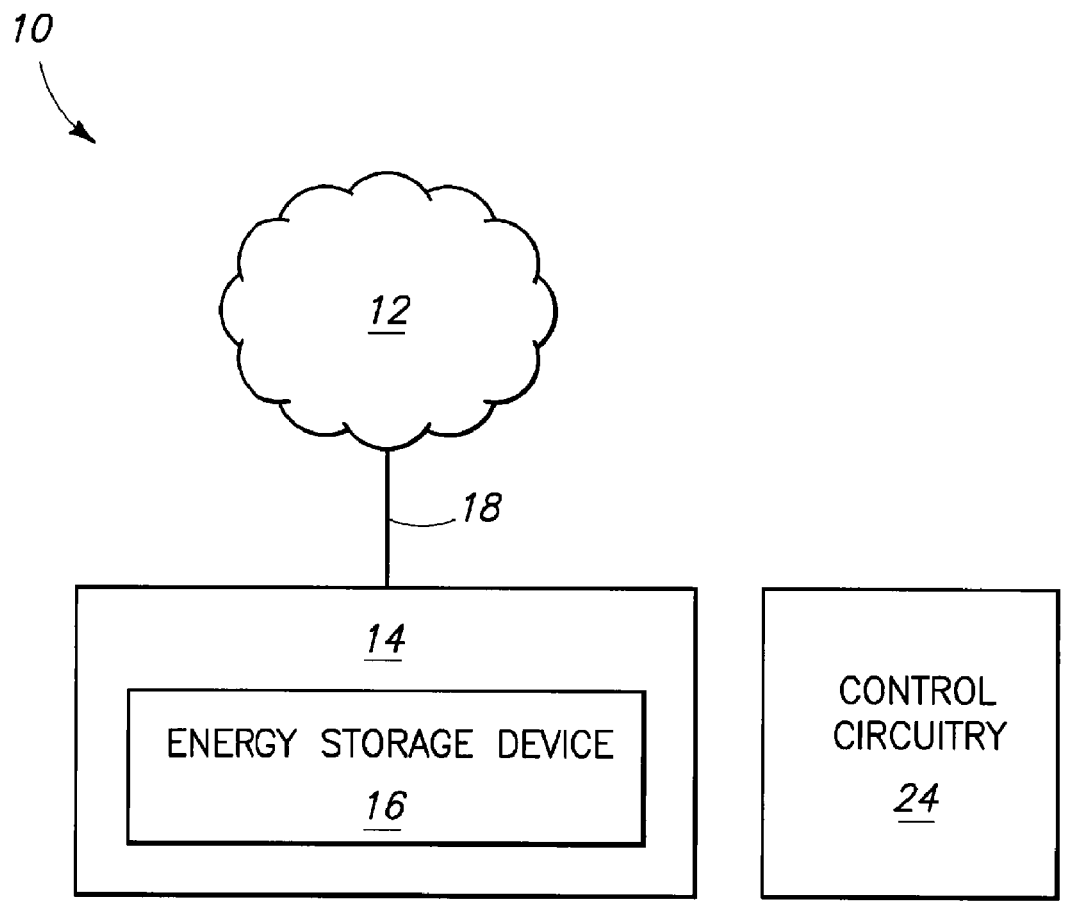
FIG. 1 is a block diagram of an energy system according to one embodiment.

Referring to FIG. 1, an energy system 10 according to one embodiment is illustrated. System 10 includes a power grid 12, an energy device 14, and control circuitry 24. Other embodiments of system 10 are possible including more, less, and/or alternative components. In one embodiment, energy device 14 includes energy storage device 16.

Power grid 12 may provide AC power to a geographical area via a plurality of electrical generating facilities, transmission lines, and other infrastructure. In some embodiments, power grid 12 may be operated by an electric utility company. The power provided by power grid 12 may have a particular frequency (e.g., 60 Hz). The particular frequency may change over time in some embodiments.

Energy device 14 may operate in one of a plurality of different modes. In an energy storage mode, energy device 14 may draw power from power grid 12 via connection 18 (or in some embodiments draw the power from a power source other than power grid 12) and convert the power into energy suitable for storage in energy storage device 16. In an energy release mode, energy device 14 may convert some or all of the energy stored in energy storage device 16 into power suitable to be transferred to power grid 12 and then transfer the converted power to power grid 12 via connection 18.

Storing energy in energy device 14 and later using the energy to generate power suitable to be transferred to power grid 12 may be economically attractive because in some cases the power transferred to power grid 12 by energy device 14 while in the energy release mode may be more valuable to the utility company operating power grid 12 than the power that energy device 14 draws from power grid 12 while in the energy storage mode.

An AC power grid (such as power grid 12) may provide varying amounts of power to consumers during a twenty-four hour period in one embodiment. The amount of power provided may be greatest during a first portion of the twenty-four hour period. This first portion may be during typical working hours when usage of building lighting, HVAC systems, computers, manufacturing equipment, and the like is greatest. In contrast, power consumption during a second portion of the twenty-four hour period may be significantly lower than the consumption during the first portion. The second portion may be during night hours when most people are sleeping.

Typically, power grids have power generating capacity that meets the needs of the first portion of the twenty-four hour period. However, having such power generating capacity may be inefficient since much of the capacity may go unused during the second portion of the twenty-four hour period. Consequently, some power grid operators offer two different rates for electricity in an attempt to shift power consumption from the first portion of the twenty-four hour period to the second portion. For example, during the first portion, a first rate may be charged for electricity and during the second portion, a cheaper second rate may be charged for electricity. Such a rate structure may encourage consumers of electricity to shift their consumption to the second portion where possible to reduce the amount of money paid for electricity.

In one embodiment, energy device 14 may be configured in the energy storage mode at night when power is sold at the second rate and may be configured in the energy release mode during the day when power generated by energy device 14 may be sold back to the operator of power grid 12 at the more expensive first rate. Although the operator of power grid 12 may lose money in this transaction, the transaction may still be beneficial to the grid operator since energy device 14 may provide power to power grid 12 during periods of peak usage when the grid operator most needs additional power.

Without the power provided by energy device 14, the grid operator may need to start a more expensive or low-efficiency generating facility or buy power from another utility to meet peak power demand during the day. Additionally or alternatively, the grid operator may need to build additional power generating facilities (e.g., natural gas or oil-fired electrical plants) to meet peak demand. Being able to receive power from energy device 14 may be more efficient and cost effective than these traditional approaches to meeting peak power demand.

The above description has assumed that an entity other than the operator of power grid 12 may benefit from energy device 14. Alternatively, in one embodiment, the operator of power grid 12 may own and operate one or more energy devices 14 to provide additional power during periods of peak demand.

In one embodiment, control circuitry 24 may control the operation of energy device 14. For example, control circuitry 24 may configure energy device 14 in the energy release mode during a first portion of a twenty-four hour period (e.g., during the day) and in the energy storage mode during a second portion of a twenty-four hour period (e.g., at night). In one embodiment, control circuitry 24 may determine when demand for power is nearing the capacity of power grid 12 and in response configure energy device 14 in the energy release mode to provide additional power to power grid 12.

Control circuitry 24 may comprise circuitry configured to implement desired programming provided by appropriate media in at least one embodiment. For example, control circuitry 24 may be implemented as one or more of a processor and/or other structure configured to execute executable instructions including, for example, software, and/or firmware instructions, and/or hardware circuitry. Example embodiments of control circuitry 24 include hardware logic, PGA, FPGA, ASIC, state machines, and/or other structures alone or in combination with a processor. These examples of control circuitry 24 are for illustration; other configurations are possible.

In one embodiment, control circuitry 24 may be part of energy device 14. Alternatively, control circuitry 24 may be located remotely from energy device 14. In one embodiment, one portion of control circuitry 24 may be part of energy device 14 and another portion of control circuitry 24 may be remotely located from energy device 14.

In one embodiment, connection 18 may be a single-phase connection whereby energy device 14 may transfer and/or receive single-phase AC power to/from power grid 12. In another embodiment, connection 18 may be a multi-phase connection (e.g., three-phase connection) whereby energy device 14 may transfer and/or receive multi-phase AC power to/from power grid 12.

Energy device 14 may convert some or all of the energy stored by energy storage device 16 into a format suitable to be transferred to power grid 12. For example, in one embodiment, energy storage device 16 may include a plurality of batteries configured to supply direct current (DC) power and energy device 14 may convert some or all of the DC power from the batteries into single-phase AC power or multi-phase AC power and provide the AC power to power grid 12 via connection 18.

Furthermore, energy device 14 may increase the amount of energy stored by energy storage device 16 by converting energy into a format suitable for energy storage device 16 and then providing the converted energy to energy storage device 16 for storage. For example, in one embodiment, energy storage device 16 may include a plurality of batteries and energy device 14 may provide current to energy storage device 16 to charge the plurality of batteries. Energy device 14 may, in one embodiment, consume power from power grid 12 in charging the batteries.

In some embodiments, a plurality of energy devices, such as energy device 14, may be used to provide power to power grid 12.

Figure 2:
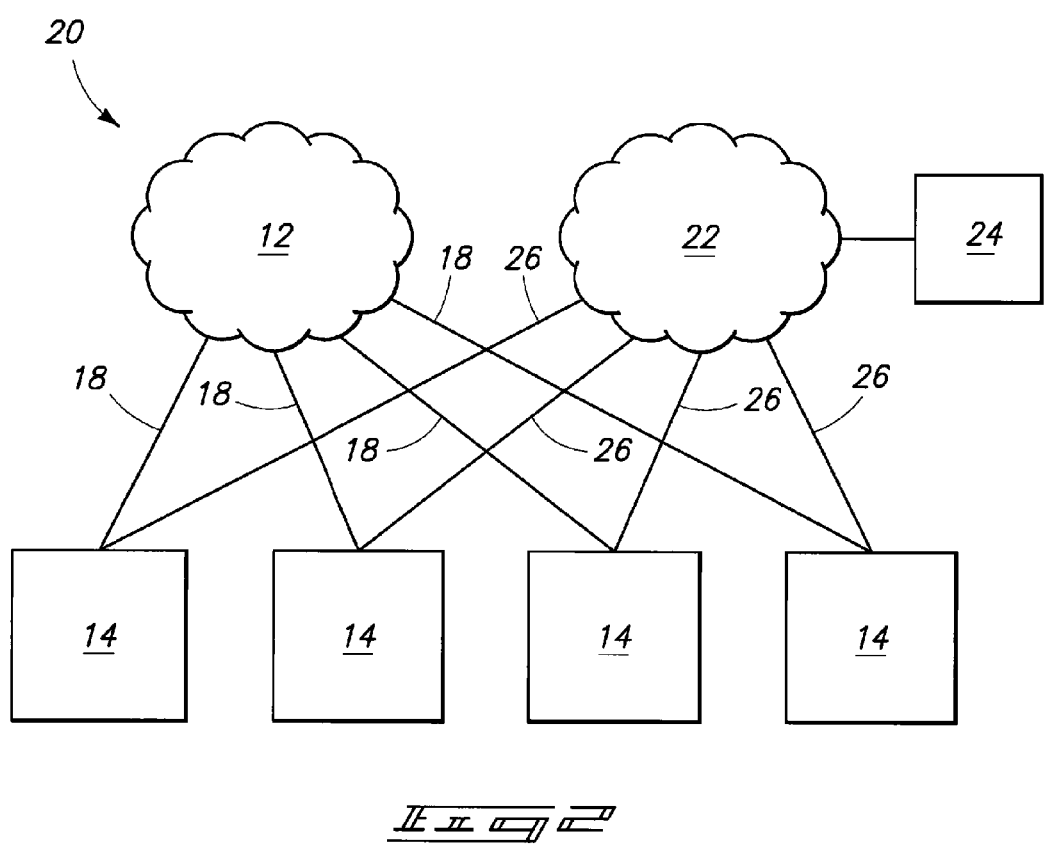
FIG. 2 is an illustrative diagram of a network of energy devices according to one embodiment.

Referring to FIG. 2, a system 20 of energy devices 14, according to one embodiment, is illustrated. System 20 includes power grid 12 and a plurality of energy devices 14. Energy devices 14 are connected to power grid 12 via connections 18. Other embodiments of system 20 are possible including more, less, and/or alternative components.

System 20 also includes a communications network 22. Energy devices 14 may be connected to communications network 22 via links 26. In one embodiment, links 26 may be wired links (e.g., telephone lines, fiber optic lines, etc.) or wireless links (e.g., infrared links, radio frequency links, etc.) or a combination of wired and wireless links.

Control circuitry 24 may control energy devices 14 via communications network 22 and links 26. For example, control circuitry 24 may configure energy devices 14 in the energy release mode, the energy storage mode, or in another mode.

In one embodiment, control circuitry 24 may have access to data describing the state of power grid 12 such as data describing an electrical characteristic of power grid 12. For example, control circuitry 24 may know the frequency of AC power provided by power grid 12. Control circuitry 24 may use the data to determine when to configure one or more of energy devices 14 in the energy release mode.

For example, control circuitry 24 may determine that the frequency of power grid 12 is decreasing because demand for power from power grid 12 is increasing. In response, control circuitry 24 may configure one or more of energy devices 14 in the energy release mode to supply additional power to power grid 12. If the frequency of power grid 12 increases in response, control circuitry 24 might not configure additional ones of energy devices 14 in the energy release mode. However, if the frequency of power grid 12 continues to decrease, control circuitry 24 may configure additional ones of energy devices 14 in the energy release mode.

Although only four energy devices 14 are depicted in FIG. 2, in some embodiments, system 20 may include thousands or millions of energy devices 14 connected to power grid 12. This large number of energy devices may be able to provide a substantial amount of power to power grid 12. For example, in some embodiments, thousands of kilowatts of power may be provided to power grid 12, which in some cases may be enough to temporarily keep power grid 12 stable for a period of time if one or more of the power generating facilities (e.g., power plants) of power grid 12 fails.

Figure 3:
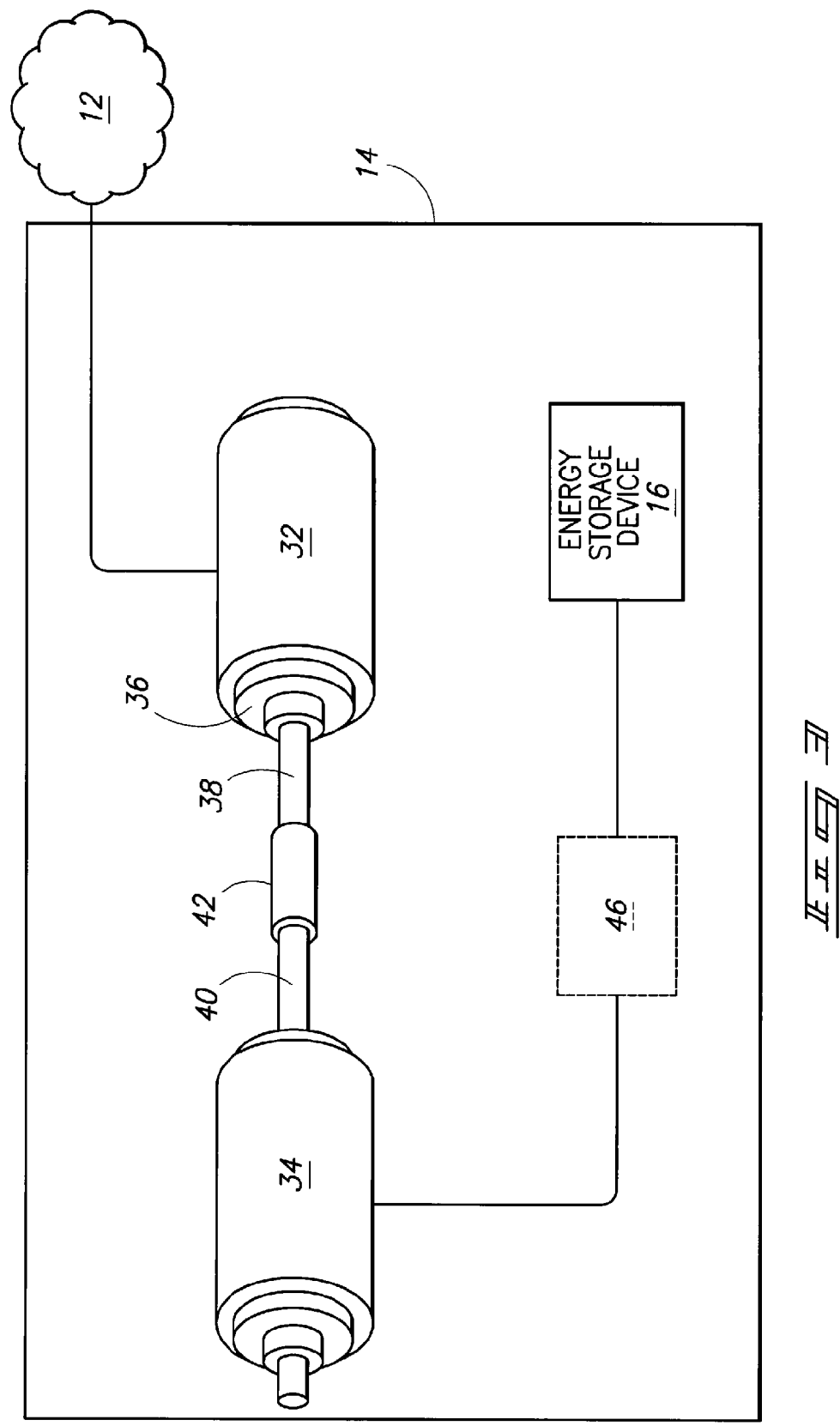
FIG. 3 is a block diagram of an energy device according to one embodiment.

Referring to FIG. 3, an energy device 14 according to one embodiment is illustrated. Energy device 14 includes a motor 34 having a shaft 40, a generator 32 having a shaft 38 and a stator 36, and energy storage device 16. In some embodiments, energy device 14 also includes energy adapter 46. Other embodiments are also possible including more, less, and/or alternative components.

Shaft 40 may be coupled to shaft 38 via a coupling 42 so that when shaft 40 is rotated, shaft 38 also rotates and conversely when shaft 38 is rotated, shaft 40 is also rotated. In one embodiment, coupling 42 may be a flexible coupling.

Motor 34 may use energy from energy storage device 16 to rotate shaft 40. In one embodiment, motor 34 may use energy directly from energy storage device 16. For example, motor 34 may be a DC motor and energy storage device may be a battery. Alternatively, energy device 14 may include energy adapter 46, which may convert energy from energy storage device 16 into a form usable by motor 34. For example, motor 34 may be an AC motor, energy storage device 16 may include a battery, and energy adapter 46 may be an inverter configured to convert DC current from the battery into AC power usable by motor 34.

Other embodiments of motor 34 and energy storage device 16 are also possible. In one embodiment, motor 34 may be a pneumatic motor and energy storage device 16 may store compressed air or a compressed gas. In another embodiment, motor 34 may be a hydraulic motor and energy storage device 16 may store a pressurized or unpressurized liquid. In yet another embodiment, motor 34 may be a DC electric motor, energy storage device 16 may store hydrogen, and energy adapter 46 may be a fuel cell that produces DC current using the stored hydrogen. Other embodiments of motor 34 are also possible.

Motor 34 may rotate shaft 40. Since shaft 40 may be coupled to shaft 38 via coupling 42, motor 34 may rotate shaft 38 in addition to rotating shaft 40.

Generator 32 may be an induction generator and may be a single-phase induction generator or a multi-phase (e.g., three-phase) induction generator. Accordingly, generator 32 may include shaft 38, a rotor (not illustrated) coupled to shaft 38 and a stator 36. Stator 36 may be adjacent to shaft 38 and, in one embodiment, may at least partially surround shaft 38 and the rotor. When an alternating current excitation voltage is applied to stator 36, stator 36 may induce currents in the rotor. The currents may cause magnetic fields in the rotor that interact with magnetic fields present in stator 36 to rotate shaft 38. In some embodiments, current is not directly supplied to the rotor. Instead, the excitation voltage applied to the stator induces current in the rotor. In one embodiment, the generator may be referred to as asynchronous.

Stator 36 may be electrically connected to power grid 12 so that power grid 12 supplies an excitation voltage to stator 36. The excitation voltage may be an AC voltage.

In one embodiment, the motor and generator may share a single shaft. The motor may rotate the shaft when supplied with energy, for example by rotating a first rotor attached to the single shaft and associated with the motor. The generator may generate power when a second rotor (associated with the generator) attached to the single shaft and located adjacent to the stator of the generator is rotated by the motor and may transfer the generated power to the power grid. In one embodiment, the motor, the generator, and the single shaft may be within a single housing.

Generator 32 may have an associated synchronous speed related to the frequency of the excitation voltage provided by power grid 12 and the number of poles in stator 36. In one embodiment, stator 36 has two poles and the synchronous speed in revolutions per minute is the frequency of the excitation voltage multiplied by sixty. For example, if the frequency of the excitation voltage is 60 Hz, the synchronous speed is 3600 rpm. In some embodiments, the frequency of the excitation voltage supplied by power grid 12 may change over time. Accordingly, the synchronous speed of generator 32 may correspondingly change over time as the frequency of the excitation voltage changes.

In one configuration, energy from energy storage device 16 may be prevented from reaching motor 34, for example, because a switch or valve is turned off. In this configuration, motor 34 does not rotate shaft 40. However, in this configuration, power grid 12 may supply an excitation voltage to stator 36 and generator 32 may operate as a motor that turns shaft 38. Since shaft 38 is coupled to shaft 40, generator 32 may rotate shaft 40 as well as shaft 38. Thus, shaft 40 may rotate even though motor 34 is not operational (i.e., not consuming energy from energy storage device 16).

Generator 32 may rotate shafts 38 and 40 at a rotational speed that is less than the synchronous speed of generator 32. The difference between the rotational speed and the synchronous speed may be referred to as the slip of generator 32. In this configuration, generator 32 might not provide any power to power grid 12. Instead, generator 32 may consume power provided by power grid 12.

In the energy release mode, energy from energy storage device 16 is allowed to reach motor 34 (either directly or via energy adapter 46). In this configuration, motor 34 rotates shaft 40 and therefore rotates shaft 38 as well. Motor 34 may be configured to rotate shaft 40 as a constant rotational speed. For example, motor 34 may be a DC motor and energy device 14 may include a pulse width modulator configured to provide DC power to motor 34 at a constant average rate from energy storage device 16 until energy storage device 16 is no longer able to provide DC power at the constant average rate. Since motor 34 receives DC power at the constant average rate from the pulse width modulator, motor 34 may rotate shaft 40 at a constant rotational speed.

Similarly, motor 34 may be an AC motor and energy device 14 may include a variable frequency drive configured to provide AC power to motor 34 at a constant average frequency from energy storage device 16 until energy storage device 16 is no longer able to provide AC power at the constant average frequency.

The constant rotational speed may be higher than the synchronous speed of generator 32. In this case, when stator 36 is electrically connected to power grid 12 and is receiving an excitation voltage from power grid 12, generator 32 may supply AC power to power grid 12 via stator 36. The amount of power supplied to power grid 12 may depend on the difference between the constant rotational speed and the synchronous speed.

The power may result from the rotor of generator 32 inducing current into stator 36, which provides the induced current to power grid 12. However, in one embodiment, the power may be generated only if power grid 12 is electrically connected to stator 36 and is supplying an AC excitation voltage to stator 36. Accordingly, if power grid 12 is electrically disconnected from stator 36, generator 32 might not generate any current or voltage in either the rotor or stator 36.

Since the amount of power supplied to power grid 12 may depend on the difference between the rotational speed of shaft 38 and the synchronous speed of generator 32, and the synchronous speed of generator 32 may change if the frequency of the excitation voltage supplied by power grid 12 changes, the amount of power supplied to power grid 12 may change if the frequency of the excitation voltage changes. This change in power may help to stabilize power grid 12.

For example, the frequency of the excitation voltage supplied by power grid 12 may decrease due to additional demand placed on power grid 12. If the frequency decreases, the synchronous speed of generator 32 will also decrease. Since the rotational speed of shaft 38 (due to motor 34) remains constant, the difference between the rotational speed of shaft 38 and the synchronous speed will increase due to the decrease in frequency of the excitation voltage. Consequently, the amount of power that generator 32 provides to power grid 12 will increase. The increase in power may help meet the increased demand causing the decrease in frequency of the grid voltage which will in turn contribute to increasing the frequency of the grid voltage toward the nominal frequency of power grid 12 (e.g., 60 Hz) thereby stabilizing power grid 12.

Conversely, the frequency of the excitation voltage supplied by power grid 12 may increase due to decreased demand (or increased supply of power) placed on power grid 12. If the frequency increases, the synchronous speed of generator 32 will also increase. Since the rotational speed of shaft 38 (due to motor 34) remains constant, the difference between the rotational speed of shaft 38 and the synchronous speed will decrease due to the increase in frequency of the excitation voltage. Consequently, the amount of power that generator 32 provides to power grid 12 will decrease. The decrease in power may contribute to decreasing the frequency of the grid voltage toward the nominal frequency of power grid 12 thereby stabilizing power grid 12.

Referring to FIG. 3A, an energy device 14A according to one embodiment is illustrated. As is illustrated in FIG. 3A, in one embodiment, energy device 14A includes the elements of energy device 14 described above. In addition, energy device 14A includes control circuitry 24 and may optionally include switches 70, 72, and 74. Other embodiments are also possible including more, less, and/or alternative components.

Switch 70 may selectively allow energy to be transferred from energy adapter 46 to motor 34. Switch 72 may selectively allow energy to be transferred from energy storage device 16 to either energy adapter 46 or to motor 34. Switch 74 may selectively electrically connect motor 32 and/or stator 36 to power grid 12. In one embodiment, switches 70, 72, and 74 may be referred to as contactors.

The portion of control circuitry 24 of energy device 14A may be in communication with another portion of control circuitry 24 via communication network 22. Control circuitry 24 may control the states of switches 70, 72, and 74 by individually opening or closing switches 70, 72, and 74. For example, when energy device 14A is in the energy release mode, control circuitry 24 may close switches 70 and 72 so that energy may flow from energy storage device 16 through energy adapter 46 to motor 34. Accordingly, by controlling switches 70 and 72, control circuitry 24 may selectively cause motor 34 to rotate shaft 40 and/or shaft 38. Furthermore, control circuitry 24 may close switch 74 so that an excitation voltage from power grid 12 may be electrically connected to stator 36. In one embodiment, control circuitry 24 may also control energy adapter 46, for example, by enabling energy adapter 46 to convert energy from energy storage device 16 or by preventing energy adapter 46 from converting energy from energy storage device 16.

In one embodiment, control circuitry 24 may configure energy device 14A in the energy release mode during a particular time (e.g., at night). In another embodiment, control circuitry 24 may detect that a frequency of power grid 12 is below a threshold and in response may configure energy device 14A in the energy release mode. In another embodiment, control circuitry 24 may detect that a frequency of power grid 12 is above a threshold and in response may configure energy device 14A so that energy device 14A is not in the energy release mode. In yet another embodiment, control circuitry 24 may configure energy device 14A in the energy release mode in response to receiving a request from an operator of energy device 14A.

Referring to FIG. 3B, an energy device 14B according to one embodiment is illustrated. As is illustrated in FIG. 3B, in one embodiment, energy device 14B includes the elements of energy device 14A described above. In addition, energy device 14B includes and energy conversion device 52. Other embodiments are also possible including more, less, and/or alternative components.

Energy conversion device 52 may convert energy into a form suitable for storage in energy storage device 16. In one embodiment, energy conversion device 52 may convert energy derived from power grid 12 into a form suitable for storage by energy storage device 16. For example, energy conversion device 52 may convert rotational energy of shaft 38 and/or shaft 40 into a form suitable for storage by energy storage device 16. In one embodiment, energy storage device 16 may include one or more batteries and energy conversion device 52 may convert the rotational energy of shaft 38 and/or shaft 40 into direct current supplied to the one or more batteries. In this example, energy storage device 16 may also include a battery charger that controls the amount of direct current supplied to the one or more batteries.

In one embodiment, energy device 14B may be configured (e.g., by control circuitry 24) in the energy storage mode. In the energy storage mode, switches 70 and/or 72 may prevent energy from energy storage device 16 from reaching motor 34. Accordingly, motor 34 might not rotate shaft 40 and may be referred to as being disabled. Switch 74 may allow stator 36 to be electrically connected to power grid 12. As a result, power grid 12 may supply stator 36 with an AC excitation voltage which may cause shaft 38 (and therefore shaft 40) to rotate. The rotational energy of shafts 38 and/or 40 may be converted to a form suitable for storage by energy storage device 16 as is described above. In the energy storage mode, energy device 14B may consume power from power grid 12.

Since, in one embodiment, generator 32 may rotate shaft 38 and thereby rotate shaft 40 during moments in time when motor 34 is disabled, generator 32 may need to overcome a rotational friction associated with shaft 40 to rotate shaft 40. In one embodiment, motor 34 may include a clutch associated with shaft 40. If the clutch is engaged, motor 34 may rotate shaft 40 but if the clutch is disengaged, motor 34 might not be coupled to shaft 40 and may be unable to rotate shaft 40. When energy device 14B is in the energy storage mode, control circuitry 24 may disengage the clutch so that the rotational friction associated with shaft 40 is less when the clutch is disengaged than when the clutch is engaged. Disengaging the clutch may allow energy device 14B to more efficiently convert energy from power grid 12 into energy stored in energy storage device 16.

In one embodiment, control circuitry 24 may prevent energy conversion device 52 from converting rotational energy of shaft 38 and/or shaft 40 into energy suitable for storage in energy storage device 16 while energy device 14B is configured in the energy release mode so that energy stored in energy storage device 16 is not used to store additional energy in energy storage device 16. For example, in one embodiment, energy conversion device 52 may be an alternator. While in the energy release mode, control circuitry 24 may prevent a field from being applied to the alternator so that the alternator does not generate DC current.

Other embodiments of energy conversion device 52 are also possible. For example, energy conversion device 52 may be a compressor configured to convert rotational energy of shafts 38 and/or 40 into a compressed gas stored in energy storage device 16. In another embodiment, energy conversion device 52 may use power supplied by power grid 12 to create hydrogen fuel, which may be stored in energy storage device 16 and later used by energy adapter 46 to create DC current consumed by motor 34.

In yet another embodiment, energy conversion device 52 may include a battery charger that may draw AC power from power grid 12, convert the AC power from power grid 12 into a DC current, and charge batteries of energy storage device 16 using the DC current. In some configurations, control circuitry 24 may be configured to enable and/or disable the battery charger.

Other embodiments of energy conversion device 52 may convert energy that is not derived from power grid 12 (e.g., naturally occurring energy) into a form suitable for storage in energy storage device 52. For example, energy conversion device 52 may convert solar power 56 and/or wind power 58 into a DC current, which may be used to charge one or more batteries of energy storage device 16.

In one embodiment, motor 34 may be a DC motor having a rotor with one or more magnets. The DC motor may be configured by control circuitry 24 to provide DC current when shafts 38 and 40 are being rotated by generator 32. Control circuitry 24 may control the amount of DC current provided by the DC motor by adjusting the amount of field current supplied to the DC motor. Accordingly, the DC motor may be used to produce a DC current that may be used to charge one or more batteries of energy storage device 16.

In one embodiment, control circuitry 24 may determine an amount of energy stored in energy storage device 16. For example, if energy storage device 16 includes a battery, control circuitry 24 may determine a voltage level of the battery. Control circuitry 24 may use the amount of energy stored to determine when to configure energy device 14B in the energy storage mode. For example, if the amount of energy stored in energy storage device 16 falls below a threshold, control circuitry 24 may configure energy device 14B in the energy storage mode. As a result, additional energy may be stored in energy storage device 16.

Control circuitry 24 may additionally or alternatively configure energy device 14B in the energy release mode based on the amount of energy stored.

In one embodiment, energy device 14B may be configured to fill energy storage device 16 in a first amount of time and to consume the energy stored in energy storage device 16 in a second amount of time. The first amount of time may be less than the second amount of time. For example, if energy storage device 16 includes a battery, energy device 14B may be configured to charge the battery in a first amount of time and to discharge the battery (by powering motor 34 in the energy release mode) in a second amount of time. In some embodiments, the first amount of time may be less than half of the second amount of time.

Referring to FIG. 3C, an energy device 14C according to one embodiment is illustrated. As is illustrated in FIG. 3C, energy device 14C includes motor 34, shaft 40, coupling 42, shaft 38, stator 36, generator 32, control circuitry 24, and switches 70, 72, and 74 described above. In the embodiment of FIG. 3C, motor 34 may be an AC induction motor. In addition, energy device 14C includes a battery 16A, an alternator 52A configured to convert rotational energy of shafts 38 and/or 40 into DC current used to charge battery 16A, a switch 66, and an inverter 46A. Other embodiments are also possible including more, less, and/or alternative components.

Inverter 46A may convert DC current supplied by battery 16A into AC power supplied to AC induction motor 34. In one embodiment, the AC power produced by inverter 46A may have a frequency higher than the frequency of the AC power supplied by power grid 12. For example, the AC power supplied by power grid 12 may have a frequency of 60 Hz and the AC power supplied by inverter 46A may have a frequency of 65 Hz.

Since motor 34 is supplied with the AC power provided by inverter 46A (which has a frequency higher than the frequency of the AC power supplied by power grid 12), motor 34 may have a higher synchronous speed than the synchronous speed of generator 32. Accordingly, motor 34 may rotate shafts 40 and 38 at a rotational speed higher than the synchronous speed of generator 32 which, as was described above, may generate power that may be provided to power grid 12 via stator 36.

Switch 66 may be used to allow or prevent a field current from being supplied to alternator 52A from battery 16A. Allowing the field current may enable alternator 52A to produce DC current from rotational energy of shafts 40 and/or 38, for example, when energy device 14C is in the energy storage mode. Preventing the field current may prevent alternator 52A from producing DC current from rotational energy of shafts 40 and/or 38, for example, when energy device 14C is in the energy release mode. Furthermore, preventing the field current may reduce a rotational friction associated with shafts 40 and/or 38 as compared to when the field current is allowed. Reducing the rotational friction may increase the efficiency with which energy device 14C may provide power to power grid 12.

Figure 4:
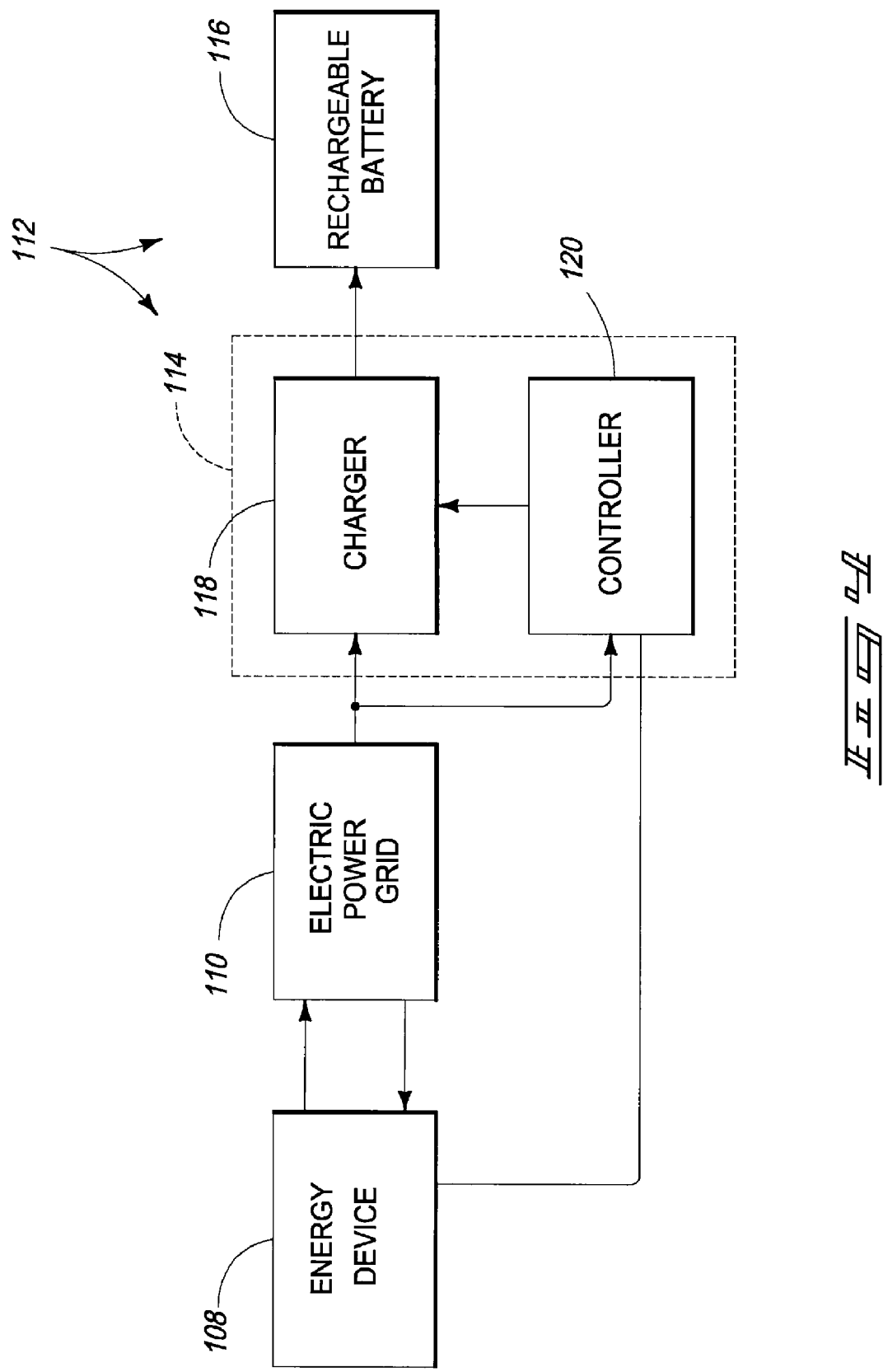
FIG. 4 is a block diagram of a battery system and an electric power grid system according to one embodiment.

Referring to FIG. 4, one embodiment of a battery system 112 is shown coupled with an electric power grid 110. Although only one battery system 112 is shown in the embodiment of FIG. 4, numerous additional battery systems 112 may be coupled with electric power grid 110 in other embodiments. In one embodiment, electric power grid 110 is arranged to provide electrical energy to battery system 112 to charge one (or more if present) rechargeable batteries 116 of the battery system 112. In some embodiments described below, the rechargeable battery or batteries 116 may be utilized to power an electrical vehicle (e.g., plug-in hybrid electric vehicle (PHEV), electric vehicle (EV), electric powered watercraft, electric powered aircraft, electric powered utility vehicles, electric powered trains, etc.). Rechargeable batteries 116 may be used in other apparatus and/or in different applications in other embodiments.

In one embodiment, electric power grid 110 comprises any appropriate electrical energy delivery system configured to deliver residential, commercial, industrial, or other electrical energy from a supply to customers or consumers. Electric power grid 110 is arranged to provide electrical energy for consumption by battery system 112, for example, for operation and for recharging rechargeable batteries 116. Electric power grid 110 may be arranged as one or more source (e.g., generator or other construction) configured to supply electrical energy. Generators may be individually taken on-line (e.g., on grid) or off-line (e.g., off grid), or the output thereof may be adjusted, according to the usage of the electrical energy. Electric power grid 110 includes a distribution grid which may comprise a plurality of switching stations, transformers, and transmission lines arranged to transmit electrical energy from sources to loads, such as the battery systems 112. The transmission lines may transmit the electrical energy using high-voltage lines spanning vast distances (e.g., hundreds or thousands of miles) between distant geographic locations in some arrangements.

As mentioned above, battery system 112 includes one or more rechargeable batteries 116 in the described embodiment. Rechargeable battery 116 may have different configurations in different implementations (e.g., lead acid, nickel metal hydride, lithium ion in some examples). During use, the state of charge of rechargeable battery 116 decreases, and electrical energy from electric power grid 110 is configured to supply electrical energy for recharging of the rechargeable battery 116 to an increased state of charge.

In addition, battery system 112 also includes a battery charging apparatus 114 in one embodiment. In the depicted embodiment, battery charging apparatus 114 is coupled between electric power grid 110 and rechargeable battery 116. Battery charging apparatus 114 is configured to implement charging operations of rechargeable battery 116 using the electrical energy from the electric power grid 110 in one embodiment.

In the depicted embodiment, battery charging apparatus 114 includes a charger 118 and a controller 120. Charger 118 is configured to receive electrical energy from electric power grid 110 and to provide the electrical energy to rechargeable battery 116 to charge rechargeable battery 116. In doing so, charger 118 may, in one embodiment, alter a form of the electrical energy received from electric power grid 110 and provide the altered electrical energy to rechargeable battery 116. For example, charger 118 may alter the voltage of the electrical energy and/or may alter the electrical energy to be DC electrical energy rather than AC electrical energy.

FIG. 4 also depicts energy device 108 coupled to electric power grid 110. Energy device 108 may be configured to store energy (e.g., electrical energy) and to transfer the stored energy to electric power grid 110. In some embodiments, transferring the stored energy to electric power grid 110 may include converting a format of the stored energy. For example, transferring electrical energy stored in a battery of energy device 108 may include converting the stored electrical energy from a DC format to an AC format suitable for use by electric power grid 110. The battery of energy device 108 may be physically distinct from rechargeable battery 116. Indeed, all of energy device 108 may be physically distinct from rechargeable battery 116 and charger 118 in one embodiment.

In another example, the energy device may store energy in the form of a pressurized fluid and transferring the stored energy may include generating AC electrical energy using the pressurized fluid and feeding the AC electrical energy into electric power grid 110.

In one embodiment, energy device 108 may be one of the embodiments of the energy device described above in relation to FIGS. 1, 2, 3, 3A, 3B, and 3C such as energy device 14. Other energy devices may alternatively be used. For example, energy device 108 may include one or more rechargeable batteries and an inverter configured to convert DC electrical energy stored by the rechargeable batteries into AC electrical power having a frequency and phase suitable for use by electric power grid 110.

In some cases, energy stored by energy device 108 may be drawn from electric power grid 110. For example, if energy device 108 stores electrical energy in batteries (which may be physically distinct from rechargeable battery 116), electrical energy from electric power grid 110 may be used to charge the batteries of energy device 108.

Energy device 108 may be physically distinct from all or portions of controller 120 and may be physically distinct from charger 118 and/or rechargeable battery 116. In one embodiment, energy device 108 may be located miles away from charger 118 and rechargeable battery 116 and energy device 108 may be connected to a different transformer of electric power grid 110 that is physically distinct and remotely located from the transformer of electric power grid 110 to which charger 118 is connected.

Controller 120 may automatically and without user intervention control charger 118 by selectively enabling charger 118 to consume energy from electric power grid 110 to charge rechargeable battery 116. For example, controller 120 may enable charger 118 to charge rechargeable battery 116 at one moment in time and may prevent charger 118 from charging rechargeable battery 116 at another moment in time. Further, controller 120, in one embodiment, may control a rate at which charger 118 charges rechargeable battery 116.

Controller 120 may additionally or alternatively, automatically and without user intervention, control energy device 108 by enabling energy device 108 to transfer energy stored by energy device 108 to electric power grid 110 at one moment in time and/or by enabling energy device 108 to consume energy from electric power grid 110 and to store at least some of the consumed energy at another moment in time. Further, controller 120, in one embodiment, may control a rate at which energy device 108 transfers the stored energy to electric power grid 110 and/or may control a rate at which energy device 108 stores energy.

In one embodiment, controller 120 may coordinate the "use" of some or all of the energy stored by energy device 108 to charge rechargeable battery 116 by transferring some or all of the energy stored by energy device 108 to electric power grid 110 while charger 118 is consuming energy from electric power grid 110 to charge rechargeable battery 116. Of course, since energy device 108 and charger 118 may be physically separated by a great distance (e.g., hundreds of feet, miles, etc.) and/or may be connected to electric power grid 110 by different transformers, the particular energy transferred by energy device 108 to electric power grid 110 might not be directly consumed by charger 118. However, since energy device 108 may provide energy to electric power grid 110 while charger 118 is drawing energy from electric power grid 110 to charge rechargeable battery 116, charger 118 may be considered to be "using" some or all of the energy stored by energy device 108 even though energy device 108 and charger 118 may be physically separated by a great distance (e.g., hundreds of feet, miles, etc.).

In some cases, energy device 108 may provide the same amount of energy to electric power grid 110 that charger 118 draws from electric power grid 110 in charging rechargeable battery 116 so that the net transaction is zero with respect to electric power grid 110. In other words, charging rechargeable battery 116, in this case, does not deplete capacity of electric power grid 110 since the amount of electrical energy consumed from electric power grid 110 is replaced with electrical energy transferred to electric power grid 110 by energy device 108.

In other cases, controller 120 may control energy device 108 to provide an amount of energy to electric power grid 110 that has a value to an operator of electric power grid 110 (e.g., a utility company) that is equivalent to a value of an amount of electrical energy that charger 118 draws from electric power grid 110 in charging rechargeable battery 116. In doing so, controller 120 may access rate information for the energy transferred from energy device 108 to electric power grid 110 to determine the value of the transferred energy and rate information for the energy consumed by charger 118 to determine the value of the energy consumed by charger 118.

For example, if charger 118 is connected to electric power grid 110 in an urban area where demand for energy from electric power grid 110 is relatively high and energy device 108 is located in a suburb distant from the urban area where demand for energy from electric power grid 110 is relatively low, the operator may value the energy stored by energy device 108 less than if energy device 108 was located in the urban area or another area where demand for energy from electric power grid 110 is relatively high.

In one embodiment, a transfer period during which energy device 108 transfers power to electric power grid 110 may fully or partially overlap a charging period during which charger 118 draws electrical energy from electric power grid 110. For example, if the charging period occurs in the afternoon when aggregate load on electric power grid 110 is close to or exceeds the capacity of electric power grid 110, the transfer period may advantageously overlap the charging period so that energy device 108 increases the capacity of electric power grid 110 while charger 118 is consuming energy from electric power grid 110.

In other embodiments, the transfer period may occur after the charging period. Delaying the transfer period may be advantageous to an operator of electric power grid 110 since the operator might not have control over when the charging period occurs. For example, in some cases, the charging period may occur when the aggregate load on electric power grid 110 is well below the capacity of electric power grid 110. In this example, the operator might not want the transfer period to occur during the charging period since electric power grid 110 may have plenty of capacity during the charging period.

Instead, the transfer period may be delayed until a time when the aggregate load on electric power grid 110 is close to or exceeds the capacity of electric power grid 110. Initiating the transfer period at this time may advantageously increase the capacity of electric power grid 110 at a time when extra capacity is needed.

In other embodiments, the transfer period may occur prior to the charging period. For example, in some cases the charging period may be scheduled to take place in the evening and the operator may initiate the transfer period prior to the scheduled charging period to advantageously increase the capacity of electric power grid 110 at a time when extra capacity is needed. In this example, prior to initiating the transfer period, the operator may be aware of a time or window of time during which the charging period is scheduled to take place.

Referring to FIG. 5, one embodiment of controller 120 is shown. The illustrated example controller 120 includes processing circuitry 122, storage circuitry 124, an external interface 126, and a user interface 128 in the depicted embodiment. Controller 120 may include more, less, and/or alternative components in other embodiments.

In one embodiment, processing circuitry 122 is arranged to process data, control data access and storage, issue commands, and control other desired operations. For example, processing circuitry 122 is configured to receive information regarding charging of an electric vehicle with energy from electric power grid 110 in one embodiment. Processing circuitry 122 may utilize the accessed information to control a transfer of energy stored by energy device 108 and/or to control charging of an electric vehicle in one embodiment.

Processing circuitry 122 may comprise circuitry configured to implement desired programming provided by appropriate media in at least one embodiment. For example, processing circuitry 122 may be implemented as one or more of processor(s) and/or other structure configured to execute executable instructions including, for example, software and/or firmware instructions, and/or hardware circuitry. Exemplary embodiments of processing circuitry 122 include hardware logic, PGA, FPGA, ASIC, state machines, and/or other structures alone or in combination with a processor. These examples of processing circuitry 122 are for illustration, other configurations are possible.

Storage circuitry 124 is configured to store programming such as executable code or instructions (e.g., software and/or firmware), electronic data, databases, or other digital information and may include processor-usable media. For example, processing circuitry 122 may control storage circuitry 124 to store information regarding charging of an electric vehicle.

Processor-usable media may be embodied in any computer program product(s) or article of manufacture(s) 25 which can contain, store, or maintain programming, data and/or digital information for use by, or in connection with, an instruction execution system including processing circuitry in the exemplary embodiment. For example, exemplary processor-usable media may include any one of physical media such as electronic, magnetic, optical, electromagnetic, infrared, or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 124 described above and/or communicated via a network or other transmission media and configured to control appropriate processing circuitry. For example, programming may be provided via appropriate media including, for example, embodied within articles of manufacture. In another example, programming may be embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure. Exemplary programming including processor-usable code may be communicated as a data signal embodied in a carrier wave in but one example.

External interface 126 is arranged to implement external communications and/or data acquisition of controller 120. For example, controller 120 may be coupled with charger 118 and may receive information regarding charging of an electric vehicle via external interface 126 in one embodiment. External interface 126 may be implemented as a network interface card (NIC), serial or parallel connection, USB port, FireWire interface, flash memory interface, floppy disk drive, or any other suitable arrangement.

User interface 128 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, user interface 128 may include a display (e.g., cathode ray tube, LCD, etc.) configured to depict visual information and an audio system as well as a keyboard, mouse and/or other input device. Any other suitable apparatus for interacting with a user may also be utilized.

Referring to FIG. 6, one embodiment of charging operations of battery system 112 (illustrated in FIG. 4) is described with respect to a load in the form of an electrical vehicle 134 which includes one or more rechargeable batteries 116. Vehicle 134 may be at least partially powered by an electric motor (not illustrated). The electric motor may consume electrical energy stored by rechargeable battery 116 to, at least in part, provide motive power to propel vehicle 134.

The arrangement of battery system 112 in FIG. 6 is illustrative for explanation of some aspects of the disclosure; other arrangements are also possible. For example, battery charging apparatus 114 of battery system 112 may be installed at home, work, or any other location where it is desirable to implement charging of rechargeable battery 116 and electrical energy from electric power grid 110 is available for consumption. Although FIG. 6 depicts rechargeable batteries 116 in electrical vehicle 134, rechargeable batteries 116 charged by battery charging apparatus 114 may be utilized in different applications other than electrical vehicles 134.

Furthermore, one or more components of the battery system 112 may be implemented differently in other embodiments. For example, battery charging apparatus 114 may be located onboard vehicle 134 in some implementations. In other arrangements, charger 118 may be located onboard vehicle 134 and controller 120 may be located offboard vehicle 134. In addition, rechargeable batteries 116 may be removable from vehicle 134 (or the housing of other loads) and coupled with charger 118, which is not located on the vehicle in some embodiments.

As was described above, controller 120 may be onboard vehicle 134 in one embodiment. If controller 120 is onboard, vehicle 134 may be connected to electrical power distribution 110 via a simple electrical cable and might not require any circuitry between vehicle 134 and electrical power distribution 110 other than the cable. In some embodiments, controller 120 may communicate with charger 118 using wired and/or wireless connections.

In another embodiment, controller 120 may be offboard vehicle 134 and charger 118 may be onboard vehicle 134. In this configuration, controller 120 may communicate with charger 118 using one or more wired and/or wireless connections.

In one embodiment, controller 120 may control and/or coordinate the charging of rechargeable battery 116 and the transfer of energy from energy device 108 to electric power grid 110. In doing so, controller 120 may access information regarding charging of electric vehicle 134 with energy from electric power grid 110. For example, charger 118 may notify controller 120 when charger 118 begins charging electric vehicle 134. Similarly, charger 118 may notify controller 120 when charger 118 completes the charging of electric vehicle 134. Controller 120 may access other information describing charging parameters of electric vehicle 134 such as the present charging state of charge for electric vehicle 134 (charging, not charging, etc.), the capacity of rechargeable battery 116, the present level of charge of electric vehicle 134 (50%, 75%, full, etc.), and other information. In one embodiment, controller 120 may receive such information from charger 118.

Controller 120 may similarly access information regarding energy device 108. For example, the present amount of energy stored by energy device 108, the capacity of energy device 108, the location of energy device 108, etc. In one embodiment, controller 120 may receive such information from charger 118

Controller 120 may use the information regarding charging of electric vehicle 134 and the information regarding energy device 108 to control a transfer of the energy stored by energy device 108 to electric power grid 110. For example, controller 120 may determine that electric vehicle 134 is being charged and in response may initiate a transfer period during which energy stored by energy device 108 is transferred to electric power grid 110 so that vehicle 134 is being charged during the transfer period.

In this manner, the transfer of the energy stored by energy device 108 to electric power grid 110 may affect the charging of electric vehicle 134 since the transfer of the energy may increase the capacity of electric power grid 110. In one embodiment, substantially all of the capacity of electric power grid 110 may be in use prior to commencement of the charging of electric vehicle 134 and the transfer of the energy stored by energy device 108 to electric power grid 110 may provide electric power grid 110 with enough additional capacity to allow for the charging of electric vehicle 134.

Accordingly, the transfer of the energy stored by device 108 may reduce effects on electric power grid 110 resulting from the charging of electric vehicle 134 as compared with a situation in which the transfer of the stored energy does not take place because the transfer of the stored energy increases the capacity of electric power grid 110 and thereby offsets the impact of the charging of electric vehicle 134 on electric power grid 110. Although the amount of the capacity of electric power grid 110 consumed by charging a single electric vehicle may be relatively small, the amount of the capacity of electric power grid 110 consumed in charging hundreds or thousands of electric vehicles may be substantial. Accordingly, offsetting the charging of hundreds or thousands of electric vehicles may be significant to an operator of electric power grid 110 who might need build additional power generation capability (e.g., new power plants) to handle the charging of the electric vehicles if not for the transfer of the stored energy.

In some situations, based on the information regarding the charging and the information regarding energy device 108, controller 120 may delay initiating the transfer period to a more desirable time when the operator desires to increase the capacity of electric power grid 110 as was described above in relation to FIG. 4.

In one embodiment, an account may be associated with electric vehicle 134 and energy device 108. In one embodiment, the account may be an account of a customer of an operator of electric power grid 110. When charger 118 consumes energy from electric power grid 110 to charge electric vehicle 134, the account may be debited based on a value of the amount of energy consumed in charging electric vehicle 134. The amount of energy consumed in charging may be measured and the amount of the debit may be determined based on the amount of energy consumed and on a price of the energy. In one embodiment, the amount consumed may be measured by an energy provider meter located off-board vehicle 134 to which vehicle 134 is connected during the charging. In some cases the energy provider meter may be operated and/or owned by an energy provider (e.g., an electric power company, utility company, charging station vendor, etc.). Controller 120 may communicate with the energy provider meter to determine the amount of energy consumed.

In another embodiment, the amount consumed may be measured by a vehicle meter onboard vehicle 134. The vehicle meter may be configured to communicate with controller 120 via wired and/or wireless communications and may be configured to communicate with other devices via wired and/or wireless communications. For example, the vehicle meter may communicate with an operator of electric power grid 110 (e.g., via a wireless communications network such as a cellular network or an automatic meter reading network) so that the operator may access information stored by the vehicle meter (e.g., amount of usage, time of usage, account identifier, etc.). In some cases, the vehicle meter and the energy provider meter may both measure the amount consumed.

Measurements made by the vehicle meter may be useful to the operator of electric power grid 110 in obtaining credits under a carbon credit program and/or a cap and trade program. Since, in some embodiments, the vehicle meter may measure consumption of electric energy used exclusively for transportation, the operator may obtain credits based on the measurements made by the vehicle meter. In contrast, measurements made by an energy provider meter through which energy consumed in charging electric vehicle 134 flows might not be usable to obtain credits since the energy provider meter might not be able to distinguish energy consumed through the meter used to charge electric vehicle 134 and energy consumed through the meter that is used for other purposes.

As noted herein, prices for consumed energy may vary based on the time of day during which the energy is consumed and the location in which the energy is consumed. Accordingly, the debit may be based on a time of day when the charging of electric vehicle 134 takes place and/or a location in which the charging of electric vehicle 134 takes place (e.g., a location of a connection between electric vehicle 134 and electric power grid 110).

When energy device 108 transfers stored energy to electric power grid 110, the account may be credited based on a value of the amount of energy transferred to electric power grid 110. The amount of energy consumed in charging may be measured and the amount of the credit may be determined based on the amount and on a price at which the operator of electric power grid 110 buys the transferred energy. In one embodiment, the amount transferred may be measured by an energy provider meter to which energy device 108 is connected. In some cases the energy provider meter may be operated and/or owned by an energy provider (e.g., an electric power company, utility company, charging station vendor, etc.). Controller 120 may communicate with the energy provider meter to determine the amount of energy transferred.

In another embodiment, energy device 108 may comprise a meter that measures the amount transferred. The meter of energy device 108 may be configured to communicate with controller 120 via wired and/or wireless communications and may be configured to communicate with other devices via wired and/or wireless communications. For example, the meter of energy device 108 may communicate with an operator of electric power grid 110 (e.g., via a wireless communications network such as a cellular network or an automatic meter reading network) so that the operator may access information stored by the vehicle meter (e.g., amount of energy transferred, time of transfer, account identifier, etc.). In some cases, the meter of energy device 108 and the energy provider meter associated with energy device 108 may both measure the transferred amount.

Like the measurements made by the vehicle meter, measurements made by the meter of energy device 108 may also be useful to the operator of electric power grid 110 in obtaining credits under a carbon credit program and/or a cap and trade program.

As noted herein, prices for energy transferred into electric power grid 110 may vary based on the time of day during which the energy is transferred to electric power grid 110 and the location in which the energy is transferred. Accordingly, the credit may be based on a time of day when the energy device 108 transfers stored energy to electric power grid 110 and/or a location in which the transfer takes place (e.g., a location of a connection between energy device 108 and electric power grid 110).

In some embodiments, as was described above, the energy stored by energy device 108 may be supplied by electric power grid 110. Accordingly, the account may be debited based on the value of the energy transferred from electric power grid 110 to energy device 108. In some cases, the value of the energy transferred from electric power grid 110 to energy device 108 may be less than the value of the energy transferred from energy device 108 to electric power grid 110. For example, energy may be transferred to energy device 108 at a time when electric rates are lower than the rates when the stored energy is transferred from energy device 108 to electric power grid 110.

At some point in time subsequent to energy device 108 transferring the stored energy to electric power grid 110 and charger 118 charging electric vehicle 134, the debits and credits associated with the account may be netted, for example, by controller 120. In one embodiment, the netting may include determining a balance of the account based on the debits and credits described above. For example, a monthly bill including debits and credits associated with a plurality of energy transfers and electric vehicle charging operations may be netted to determine a balance of the account.

In one embodiment controller 120 may control charger 118 so that a value of an amount of energy consumed by charger 118 in charging electric vehicle 134 is less than or equal to a value of the amount of energy transferred to electric power grid 110 by energy device 108. Doing so may be advantageous as it may prevent an operator of electric vehicle 134 from incurring a debit to the account as a result of the charging that is greater than the credit to the account resulting from the transfer of energy by energy device 108.

As was mentioned above, the value of energy at the location of the charging may be different than the value of the energy at the location of the energy device 108. Accordingly, the debit of the account may be based on the location of electric vehicle 134, charger 118, and/or rechargeable battery 118 and the credit of the account may be based on the location of energy device 108.

Furthermore, as was mentioned above, the price charged by an operator of electric power grid 110 for energy consumed from electric power grid 110 (e.g., by charger 118) and/or the price paid by an operator of electric power grid 110 for energy transferred to electric power grid 110 (e.g., by energy device 108) may vary according to the time of day. Accordingly, the debit of the account may be based on a time at which the charging of electric vehicle 134 takes place and the credit of the account may be based on a time at which the discharge of stored energy from energy device 108 to electric power grid 110 takes place.

In one embodiment, controller 120 may determine an amount of energy stored by energy device 108 (e.g., by communicating with energy device 108) and controller 120 may control charger 118 based on the amount of energy stored by energy device 108. For example, controller 120 may enable charger 118 to consume an amount of energy equal to or less than the amount of energy stored by energy device 108 or may enable charger 118 to consume an amount of energy equal to or less than the amount of energy transferred to electric power grid 110 by energy device 108. In doing so, controller 120 may monitor the amount of energy consumed via the energy provider meter and/or the vehicle meter described above.

In one embodiment, the amount of energy transferred to electric power grid 110 by energy device 108 may be measured by a meter of energy device 108 and/or an energy provider meter (described above) through which the transferred energy flows and controller 120 may determine the amount of energy transferred to electric power grid 110 by communicating with the electric power meter (e.g., via a communications network such as an automatic meter reading network or cellular network).

In another example, controller 120 may estimate an amount of energy that will be transferred to electric power grid 110 based on the amount of energy stored by energy device 108. The estimate may account for losses incurred in transferring the stored energy to electric power grid 110. The estimate may be based on actual or predicted efficiency of the transfer of the stored energy to electric power grid 110. For example, controller 120 may estimate that the transfer is 85% efficient and may therefore estimate that 85% of the energy stored by energy device 108 may be actually transferred into electric power grid 110.

In some cases, controller 120 may determine (e.g., by communicating with charger 118), that electric vehicle 134 is not fully charged even though charger 118 has consumed an amount of energy equal to the amount of energy stored by energy device 108 or the amount of energy transferred to electric power grid 110 by energy device 108.

In these cases, controller 120 may notify a user (e.g., a person who initiates charging electric vehicle 134) via user interface 128 and may prompt the user decide whether to terminate charging electric vehicle 134 because the amount of energy stored by energy device 108 has been consumed or to continue charging vehicle 134 knowing that an account associated with the user or with electric vehicle 134 may be debited based on an additional amount of energy consumed from electric power grid 110 beyond the amount of energy stored by energy device 108.

In one embodiment, controller 120 may prompt the user (e.g., via user interface 128) for an identifier associated with the account (e.g., an account number) prior to controller 120 enabling charger 118 to consume energy from electric power grid 110. Controller 120 may further authenticate the identifier, for example, by requesting a password associated with the identifier. Controller 120 may additionally or alternatively prompt the user for an identifier associated with energy device 108 in some embodiments and may authenticate the identifier associated with energy device 108. In another embodiment, controller 120 may be programmed with the account identifier and might not need to request the account identifier.

Note that although controller 120 may determine at a moment in time that charger 118 has consumed an amount of energy equal to the amount of energy stored by energy device 108 (e.g., by communicating with charger 118 and/or the vehicle meter and/or the energy provider meter), the actual energy stored by energy device 108 may or may not have been transferred to electric power grid 110 at the moment in time since the transfer may happen after the charging is complete, as was discussed above.

Further, controller 120 may alternatively enable charger 118 to consume an amount of energy having a value less than or equal to the value of the amount of energy stored by energy device 108 and may use the method described above to notify the user when charger 118 has consumed an amount of energy having a value equal to the value of the amount of energy stored by energy device 108. This may be advantageous in configurations where a price of energy consumed by charger 118 is different than a price of energy transferred to electric power grid 110 by energy device 108.

Controller 120 may be embodied in many different ways. In one embodiment, energy device 108 may be a small residential device located in a home garage that is controlled by an operator of electric power grid 110 rather than by a resident of the home and charger 118 may be located away from the home, for example, in a charging station of a parking garage of an office building.

In this embodiment, controller 120 may be embodied as one or more computers associated with the operator of electric power grid 110 and controller 120 may communicate with charger 118 and with energy device 108 as was described above. In one embodiment, controller 120 may communicate with charger 118 and with energy device 108 via a wired or wireless network.

In some configurations, charger 118 may be onboard electric vehicle 134. In one embodiment, a first portion of controller 120 may be onboard electric vehicle 134 and may communicate with charger 118. The first portion may be integrated with other electronics onboard electric vehicle 134 in some configurations. For example, controller 120 may communicate with a navigation system of vehicle 134 and/or user interface 128 may comprise a display of vehicle 134 that may be shared with the navigation system. A second portion of controller 120 may be embodied as one or more computers associated with the operator of electric power grid 110. The second portion may perform the netting described above. A third portion of controller 120 may be onboard energy device 108. The first, second, and third portions may be in communication with each other.

In another embodiment, a first portion of controller 120 may be onboard electric vehicle 134 and may communicate with charger 118 and a second portion of controller 120 may be embodied as one or more computers associated with the operator of electric power grid 110.

In another embodiment, a first portion of controller 120 may be onboard electric vehicle 134 and may communicate with charger 118 and a second portion of controller 120 may be onboard energy device 108.

As was mentioned above, in some embodiments, charger 118 may be connected to a first transformer of electric power grid 110 that is physically distinct and remotely located from a second transformer of electric power grid 110 to which energy device 108 is connected. In fact, the first transformer may be owned and/or operated by a first electric power company and the second transformer may be owned and/or operated by a second electric power company that is different from the first electric power company. In this case, electric power grid 110 may include equipment (e.g., transformers, power generators, transmission lines, etc.) owned and/or operated by more than one company. This situation may arise, for example, if an owner of electric vehicle 134 travels away from home (where energy device 108 is located) to a distant city and charges electric vehicle 134 while in the distant city.

For example, electric power grid 110 may comprise two distinct electric power grids, a first electric power grid owned and/or operated by the first electric power company that services a first geographical area and a second electric power grid owned and/or operated by the second electric power company that services a second geographical area. The two distinct electric power grids that make up electric power grid 110 may be interconnected to each other by one or more transmission lines and/or may be interconnected to each other via a third distinct electric power grid (which is part of electric power grid 110) owned and/or operated by a third electric power company. The interconnection may allow the first electric power grid to send power to and/or receive power from the second electric power grid.

An account associated with energy device 108 and charger 118 may be associated with the second electric power company. In this case, determining a balance for the account may include the second electric power company receiving debit information regarding energy consumed by charger 118 via the first transformer from the first electric power company since the energy consumed was provided by the first electric power grid. The information may include an identifier of the account, the day and time the consumption took place, an amount of the consumption, a rate for the energy consumed, and/or a total amount of a debit for the consumption. The second electric power company may compensate the first electric power company for the consumption of the second energy.

In one embodiment, an operator of charger 118 (e.g., a driver of an electric vehicle comprising charger 118) might not be charged for consumption of power from the first electric power grid at the time of the consumption. Instead, the operator may provide the first electric power company with an identifier of the account, or other information related to the account. The first electric power company may then use the identifier or other account information to debit the second electric power company for the consumption rather than billing the operator of charger 118 directly. In this manner, the relationship between the first electric power company and the second electric power company may be similar to the relationship between wireless telephone network operators who allow subscribers to roam onto their networks. According to this relationship, the wireless telephone network operators compensate each other for services provided to roaming subscribers. In this relationship, subscribers are billed by their home wireless telephone network operator rather than being billed for roaming directly by the wireless telephone network operator on whose network they roamed.

A similar relationships may be established between the first electric power company and the second electric power company so that when customers associated with the second electric power company "roam" onto the first electric power grid by consuming energy provided by the first electric power grid, the second electric power company may compensate the first electric power company for the consumption.

This relationship may be especially advantageous when large numbers of customers of the first electric power company consume power from the second electric power grid (referred to hereafter as second electric power grid roaming consumption) and large numbers of customers of the second electric power company consume power from the first electric power grid (referred to hereafter as first electric power grid roaming consumption).

A settlement system comprising processing circuitry, storage circuitry, an external interface, and a user interface similar to the circuitry and interfaces described above in relation to FIG. 5 may keep track of roaming consumption over a period. For example, during a day, the settlement system may determine a total amount of both first electric power grid roaming consumption and second electric power grid roaming consumption. At the end of the day, the settlement system may determine a difference between the two roaming consumption amounts. If the first electric power grid roaming consumption is greater than the second electric power grid roaming consumption, the second electric power company may compensate the first electric power company for the difference. The compensation may be coordinated or performed by the settlement system. Although a day was used as an example period above, other periods (a minute, hour, week, month, etc.) may alternatively be used.

In one embodiment, compensating may involve the second electric power company providing payment to the first electric power company. In another embodiment, compensating may involve the second electric power company transferring power to the first electric power grid via an interconnection between the first electric power grid and the second electric power grid. In this embodiment, the transfer may take place during a time when the first electric power grid needs extra capacity. In one embodiment, energy stored by energy devices may be transferred to the second electric power grid during the transfer of power from the second electric power grid to the first electric power grid. In one embodiment, the settlement system may initiate the transfer of stored energy to the second electric power grid by communicating with controller 120.

In one embodiment the first and second electric power grid roaming consumptions may be based not only on an amount of energy consumed but also on the value of the energy consumed. As was discussed above, the time during which the energy was consumed and/or the location in which the energy was consumed may influence the value of the consumption. The settlement system may access information regarding consumption on the first and second electric power grids (e.g., time, location, and amount of the consumption) to determine values of the consumption.

In one embodiment, a settlement relationship similar to the relationship described above between the first electric power company and the second electric power company may be established between the second electric power company and a fourth electric power company. The fourth electric power company might not own or operate its own electric power grid. Instead, power consumed by customers of the fourth electric power company may be provided by the second electric power grid and the fourth electric power company may service all or a subset of the geographical area serviced by the second electric power company.

In one embodiment, electric vehicle 134 may comprise the vehicle meter described above and may comprise a portion of controller 120. Electric vehicle 134 may be associated with a primary energy provider, which may be the energy provider that supplies energy to charge electric vehicle 134 when the vehicle is in its home location. Of course, electric vehicle 134 may travel outside of the geographical area serviced by the primary energy provider and while outside of the geographical area may need to be recharged. Electric vehicle 134 may be connected to an electric power grid operated by a secondary energy provider and may recharge by consuming energy from the electric power grid of the secondary energy provider. In this situation, electric vehicle 134 may be described as "roaming" onto the secondary energy provider's electric power grid.

The vehicle meter may advantageously measure energy consumed from the secondary energy provider in charging electric vehicle 134. Controller 120 may communicate consumption information regarding the amount of energy consumed from the secondary energy provider to the secondary energy provider and/or the primary energy provider (e.g., via the settlement system). The consumption information may include the amount of the consumption (e.g., as measured by the vehicle meter), the location in which the energy was consumed, the time period during which the consumption took place, and the make and model of electric vehicle 134. In some configurations, controller 120 may determine the location of the consumption directly or by communicating with a global positioning system receiver, cellular telephone network, vehicle navigation system, or other device capable of determining a location (e.g., a latitude and longitude).

In addition, controller 120 may communicate account related information to the secondary energy provider and/or the primary energy provider such as an account identifier associated with electric vehicle 134 and/or with an operator of electric vehicle 134, an identifier associated with the primary energy provider, and an identifier of electric vehicle 134 (e.g., a VIN number).

The secondary energy provider (e.g., via the settlement system) may use the consumption information and/or the account related information to seek compensation from the primary energy provider for the energy the secondary energy provider provided to charge electric vehicle 134. The secondary energy provider may be compensated using one or more of the methods described above. The secondary energy provider (e.g., via the settlement system) may also use the consumption information to identify an energy provider meter through which the energy used to recharge electric vehicle 134 was consumed. The energy provider meter may be owned and/or operated by the secondary energy provider.

The secondary energy provider (e.g., via the settlement system) may identify the energy provider meter by comparing the time of the consumption, the location of the consumption, and/or the amount of the consumption to information collected from energy provider meters located near the location of the consumption.

In some cases, the identification may be straightforward since there might be only one energy provider meter located near the consumption location. In other cases, there may be several energy provider meters near the consumption location and the secondary energy provider may need to gather time-based usage information from the energy provider meters near the location and determine which of the energy provider meters dispensed an amount of energy equal to the amount consumed by the charging during the time period during which electric vehicle 134 was being charged.

Upon identifying the energy provider meter used to charge electric vehicle 134, the secondary energy provider (e.g., via the settlement system) may credit an account associated with the identified meter (which may be different from the account associated with electric vehicle 134) since the secondary energy provider may recover compensation for the consumed energy from the primary energy provider or from the operator of electric vehicle 134.

In another embodiment, the secondary energy provider (e.g., via the settlement system) might not rely on measurements made by a vehicle meter to seek compensation. Instead, the secondary energy provider may use measurements made by an energy provider meter to seek compensation.

Although the above discussion has been directed towards consuming energy from electric power grid 110 to charge a rechargeable battery or charge an electric vehicle, the methods, systems, and apparatuses described above can be applied to controlling the flow of energy from electric power grid 110 to a load that consumes the energy and transferring energy stored by energy device 108 to electric power grid 110 to offset the energy consumed by the load. For example, controller 120 may control energy device 108 to discharge stored energy to electric power grid 110 when an air conditioner (one example of a load) is consuming energy from electric power grid 110 and may control a switch or regulator configured to enable or disable energy from flowing from electric power grid 110 to the load. In this example, energy device 108 need not be physically located near the air conditioner.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An electric vehicle charging method comprising:
 receiving information regarding charging of an electric vehicle with energy from an electric power grid;
 determining an amount of energy stored by an energy device coupled to the electric power grid; and
 controlling a transfer of the energy stored by the energy device to the electric power grid using the information regarding the charging of the electric vehicle.

2. The method of claim 1 wherein the receiving of the information comprises receiving information regarding timing of the charging of the electric vehicle and wherein the controlling of the transfer comprises controlling timing of the transfer using the information regarding the timing of the charging.

3. The method of claim 1 further comprising controlling the charging of the electric vehicle so that an amount of the energy consumed by the charging is less than or equal to the amount of the energy stored by the energy device.

4. The method of claim 1 wherein the controlling of the transfer comprises controlling the transfer to affect the charging of the electric vehicle.

5. The method of claim 1 wherein the controlling of the transfer comprises controlling the transfer to reduce effects on the electric power grid resulting from the charging of the electric vehicle compared with not controlling the transfer of the energy stored by the energy device using the information regarding the charging of the electric vehicle.

6. The method of claim 1 further comprising controlling the charging of the electric vehicle based on the amount of the energy stored by the energy device.

7. The method of claim 6 wherein the controlling of the charging of the electric vehicle comprises controlling the charging so that an amount of the energy from the electric power grid consumed by the charging of the electric vehicle is less than or equal to the amount of the energy stored by the energy device.

8. The method of claim 1 further comprising controlling the charging of the electric vehicle based on an amount of the energy transferred from the energy device to the electric power grid.

9. The method of claim 8 wherein the controlling of the charging of the electric vehicle comprises controlling the charging so that an amount of the energy from the electric power grid consumed by the charging of the electric vehicle is less than or equal to the amount of the energy transferred from the energy device to the electric power grid.

10. A battery charging method comprising:
   storing first energy from an electric power grid using an energy device coupled to the electric power grid, the energy device being associated with an account;
   consuming second energy from the electric power grid to charge a rechargeable battery associated with the account, the rechargeable battery being physically distinct from the energy device;
   discharging the first energy stored by the energy device to the electric power grid; and
   determining a balance of the account based on the consuming of the second energy and the discharging of the first energy.

11. The method of claim 10 wherein the determining of the balance comprises crediting the account based on an amount of the first energy stored by the energy device, debiting the account based on an amount of the second energy consumed to charge the rechargeable battery, and netting the account based on the crediting and the debiting.

12. The method of claim 10 wherein the determining of the balance comprises crediting the account based on an amount energy transferred to the electric power grid as a result of the discharging, debiting the account based on an amount of the second energy consumed to charge the rechargeable battery, and netting the account based on the crediting and the debiting.

13. The method of claim 12 wherein the crediting comprises crediting based on a location of the energy device.

14. The method of claim 12 wherein the debiting comprises debiting based on a location of the rechargeable battery during the consuming.

15. The method of claim 12 wherein the crediting comprises crediting based on a time of day during which the discharging of the first energy takes place.

16. The method of claim 12 wherein the debiting comprises debiting based on a time of day during which the consuming of the second energy takes place.

17. The method of claim 10 further comprising coupling an electric vehicle comprising the rechargeable battery to the electric power grid prior to the consuming of the second energy.

18. The method of claim 10 wherein during the consuming of the second energy, the rechargeable battery is coupled to the electric power grid via a first transformer and the energy device is coupled to the electric power grid via a second transformer physically distinct from the first transformer and remotely located from the first transformer.

19. The method of claim 18 wherein the first transformer is operated by a first electric power company, the second transformer is operated by a second electric power company different from the first electric power company, the account is associated with the second electric power company, the determining of the balance of the account comprises the second electric power company receiving debit information regarding the charging of the rechargeable battery from the first electric power company, and the method further comprises the second electric power company compensating the first electric power company for the consumption of the second energy.

20. The method of claim 10 further comprising controlling the discharging of the first energy based on the consuming of the second energy so that the consuming of the second energy and the discharging of the first energy occur simultaneously.

21. The method of claim 10 further comprising controlling the discharging of the first energy so that the discharging of the first energy occurs subsequent to the consuming of the second energy.

22. The method of claim 10 further comprising controlling the discharging of the first energy so that the discharging of the first energy occurs prior to the consuming of the second energy.

23. An electric vehicle charging system comprising:
   an electric power grid;
   an electric vehicle coupled to the electric power grid;
   an energy device coupled to the electric power grid; and
   processing circuitry configured to:
      receive information regarding charging of the electric vehicle with energy from the electric power grid;
      determine an amount of energy stored by the energy device; and
      control a transfer of the stored energy to the electric power grid using the information regarding the charging of the electric vehicle.

24. The system of claim 23 wherein the electric vehicle comprises at least a portion of the processing circuitry.

25. The system of claim 23 wherein the energy device comprises at least a portion of the processing circuitry.

26. An energy device control apparatus comprising:
   processing circuitry configured to:
      access first information regarding first energy stored by an energy device coupled to an electric power grid, the energy device being associated with an account;
      access second information regarding charging of an electric vehicle with second energy from the electric power grid, the electric vehicle being associated with the account;
      control the energy device to transfer the stored first energy to the electric power grid based on the first information; and
      determine a balance of the account based on the second information and the transfer of the stored first energy to the electric power grid.

27. The apparatus of claim 26 wherein the accessing of the second information comprises receiving information regarding timing of the charging of the electric vehicle and wherein the controlling of the transfer comprises controlling timing of the transfer using the information regarding the timing of the charging.

28. The apparatus of claim 26 wherein the controlling of the transfer comprises controlling the transfer to affect the charging of the electric vehicle.

29. An electric vehicle comprising:
   a rechargeable battery;
   a charger; and
   processing circuitry configured to:
      access information regarding an amount of first energy stored by an energy device coupled to an electric power grid, wherein the electric vehicle and the energy device are associated with an account;

control a transfer of second energy from the electric power grid to the rechargeable battery via the charger using the information regarding the amount of the first stored energy; and wherein a balance of the account is determined based upon an amount of the first energy transferred from the energy device to the electric power grid and an amount of the second energy transferred from the electric power grid to the charger to charge the rechargeable battery.

* * * * *

UNITED STATES PATENT AND TRADEMARK OFFICE
CERTIFICATE OF CORRECTION

PATENT NO.        : 8,319,358 B2                                       Page 1 of 1
APPLICATION NO.   : 12/533834
DATED             : November 27, 2012
INVENTOR(S)       : Curry et al.

It is certified that error appears in the above-identified patent and that said Letters Patent is hereby corrected as shown below:

In the Specification

Column 19, line 4 – Delete "118 and" and insert --116 and--

Column 19, line 57 – Delete "the user decide" and insert --the user to decide--

Column 21, line 64 – Delete "A similar relationships" and insert --A similar relationship--

Signed and Sealed this
Twenty-fifth Day of March, 2014

Michelle K. Lee
*Deputy Director of the United States Patent and Trademark Office*